United States Patent [19]

Lowery

[11] Patent Number: 5,402,518
[45] Date of Patent: Mar. 28, 1995

[54] SOUND STORAGE AND SOUND RETRIEVAL SYSTEM HAVING PERIPHERAL WITH HAND OPERABLE SWITCHES

[75] Inventor: David R. Lowery, Alpharetta, Ga.

[73] Assignee: PCvoice, Inc., Alpharetta, Ga.

[21] Appl. No.: 918,849

[22] Filed: Jul. 22, 1992

[51] Int. Cl.$^6$ ............................................. G10L 3/00
[52] U.S. Cl. ................... 395/2.1; 395/2.79
[58] Field of Search ............ 370/110.1; 379/58; 395/725, 2.79, 2, 2.1; 381/41–47

[56] References Cited

U.S. PATENT DOCUMENTS

| | | | |
|---|---|---|---|
| 4,677,569 | 6/1987 | Nakano et al. | 395/2 |
| 4,776,016 | 10/1988 | Hansen | 381/42 |
| 4,799,144 | 1/1989 | Parruck et al. | 364/200 |
| 4,926,355 | 5/1990 | Boreland | 395/725 |
| 4,987,497 | 1/1991 | Stults et al. | 358/181 |
| 5,008,835 | 4/1991 | Jackmann et al. | 395/2.79 |
| 5,056,145 | 10/1991 | Yamamoto et al. | 395/2.79 |
| 5,095,503 | 3/1992 | Kowalski | 379/63 X |
| 5,127,003 | 6/1992 | Doll, Jr. et al. | 370/110.1 |
| 5,138,649 | 8/1992 | Krisbergh | 358/85 |
| 5,191,602 | 3/1993 | Regen et al. | 379/58 |
| 5,263,118 | 11/1993 | Cornelison | 395/2 |

Primary Examiner—David D. Knepper
Attorney, Agent, or Firm—Skjerven, Morrill, MacPherson, Franklin & Friel

[57] ABSTRACT

A sound compression/decompression peripheral which operates with a host computer or other remote sound data storage device. The peripheral comprises a plurality of hand operable switches which may be dedicated to functions to which users of tape recorders are accustomed such as "RECORD" "PLAY" "STOP" "REWIND" "FAST FORWARD" and "PAUSE". The switches may also perform other functions. One possible embodiment of the peripheral comprises: a microphone; a speaker; a μLaw codec which converts the analog signals from the microphone into digital pulse code modulated signals, and which converts digital pulse code modulated signals into corresponding analog signals for driving the speaker; a digital signal processor which compresses sound information carried in the pulse code modulated signals, which outputs compressed sound data to a microcontroller, which receives compressed sound data from the microcontroller, which decompresses the compressed sound data into pulse code modulated signals, and which outputs pulse code modulated signals to the encoder/decoder; a microcontroller which buffers compressed sound data between a personal computer and the digital signal processor, which monitors the status of a plurality of hand operable switches, and which relays switch status to the personal computer; and a plurality of hand operable switches.

32 Claims, 23 Drawing Sheets

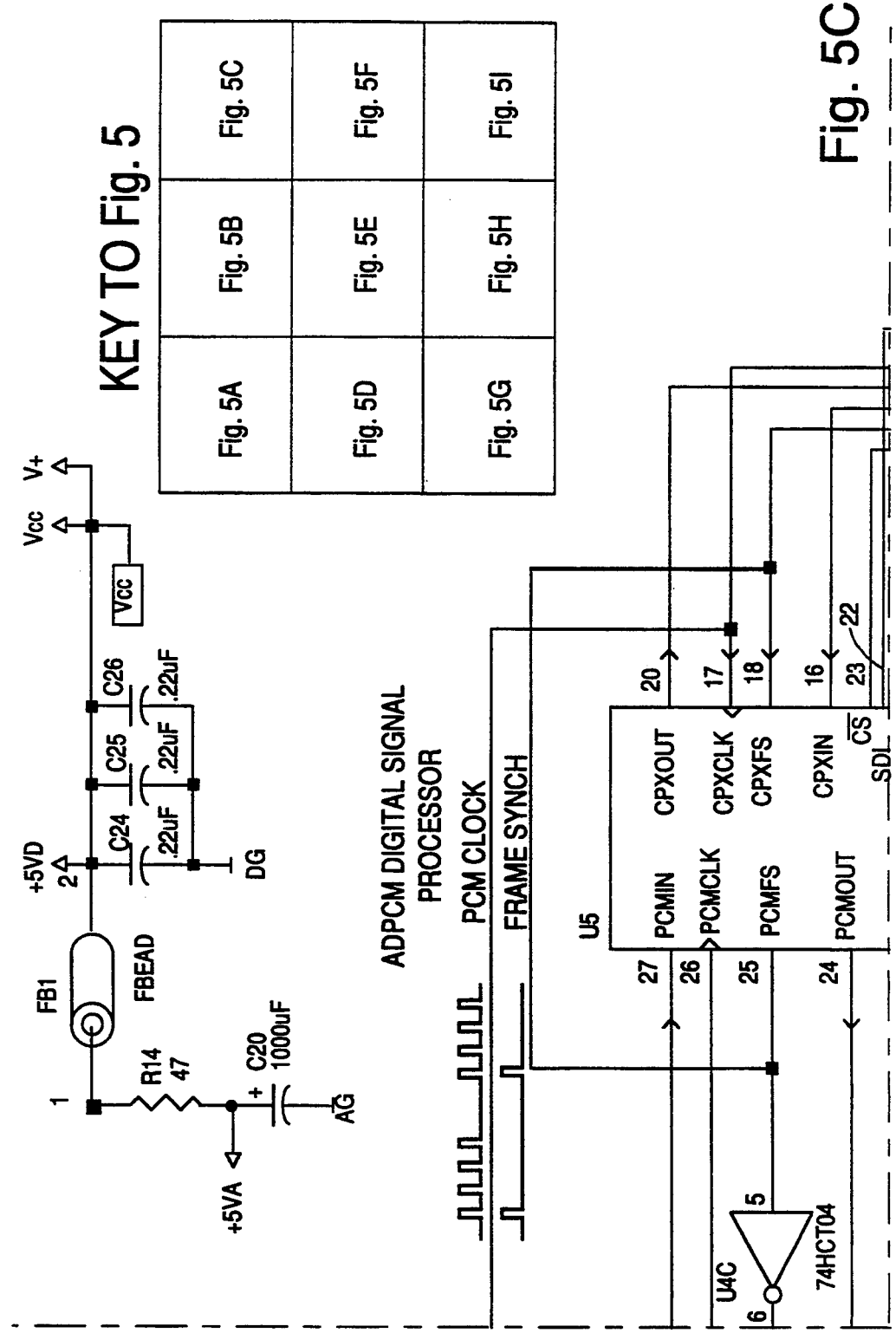

SOUND STORAGE AND SOUND RETRIEVAL SYSTEM HAVING PERIPHERAL WITH HAND OPERABLE SWITCHES

FIELD OF THE INVENTION

This invention relates to the storage and retrieval of sound information. More particularly, this invention relates to the storage and retrieval of sound information controlled at least in part by a peripheral having a plurality of hand operable switches.

BACKGROUND OF THE INVENTION

Sound compression/decompression peripherals are commercially available for personal computers. These sound compression/decompression peripherals typically convert sound waves into analog electrical signals, digitize and compress these analog electrical signals into compressed digital sound data, and store the compressed digital sound data in a personal computer. These peripherals also typically retrieve the stored compressed digital sound data from the personal computer, decompress and convert the compressed digital sound data into analog electrical signals, and drive a speaker to recreate sound waves representative of the originally received sound waves. With such a sound compression/decompression peripheral, multiple types of sounds including speech and/or music may be stored and retrieved on a personal computer.

A user of such a conventional sound compression/decompression peripheral typically controls the operation of the device from the keyboard of the personal computer. Alternatively, the user may control operation of the device via a mouse or other manual entry pointing device. If sound reception and compression is to be initiated, for example, the user determines which of the keys or combinations of keys on the computer keyboard must be pressed in order to start the desired operation. If a mouse is used, the user typically moves the mouse to identify a particular selection and then presses a key on the mouse to select the identified selection. Then, if sound reception and compression is to be halted, the user must redetermine which of the keys or combination of keys on the computer keyboard must be pressed in order to halt the operation. If a mouse is used, the user typically redetermines which selection to identify, moves the mouse to identify that selection and then represses the key on the mouse. This type of user interface for operating a sound compression/decompression peripheral may be cumbersome, unnatural, confusing, and difficult for some users to use. A sound compression/decompression device having a more convenient, natural, understandable, and easy to use user interface is therefore sought.

SUMMARY OF THE INVENTION

In accordance with the invention, a sound compression/decompression peripheral is provided which comprises a plurality of hand operable switches. These hand operable switches are, in one embodiment, dedicated to functions to which users of tape recorders are accustomed. In this embodiment, one switch is a "RECORD" switch, another is a "PLAY" switch, another is a "STOP" switch, another is a "REWIND" switch, another is a "FAST FORWARD" switch, and another is a "PAUSE" switch.

In another embodiment, the switches also perform other functions. If, for example, the peripheral is not in a sound compression/decompression mode, various of the switches are usable to allow the user to move between software menus and/or to select items from a software menu. When the personal computer enters the sound compression/decompression mode, the switches reassume their RECORD, PLAY, STOP, REWIND, FAST FORWARD, and PAUSE functions.

Another embodiment of the sound compression/decompression peripheral comprises: a microphone for converting sound waves into analog electrical signals indicative of the sound waves; a speaker for converting analog electrical signals into sound waves; an encoder/decoder such as a $\mu$Law codec for converting the analog signals into digital pulse code modulated signals and for converting digital pulse code modulated signals into corresponding analog signals; a digital signal processor such as a digital signal processor performing ADPCM compression and decompression for receiving pulse code modulated signals from the encoder/decoder, for compressing sound information carried in the pulse code modulated signals, for outputting compressed sound data to a microcontroller, for receiving compressed sound data from the microcontroller, for decompressing the compressed sound data into pulse code modulated signals, and for outputting pulse code modulated signals to the encoder/decoder; a microcontroller for buffering compressed sound data between a personal computer and the digital signal processor, for monitoring the status of a plurality of hand operable switches, and for relaying that status of the switches to the personal computer; and a plurality of hand operable switches.

In still another embodiment of the peripheral, the peripheral is a hand holdable peripheral which can be grasped in the hand of a user such that a thumb or a finger of the hand grasping the peripheral can manipulate the switches. Such a hand holdable peripheral is linked to a personal computer or another remote sound data storage device via a serial bus, a parallel bus, or a wireless serial link. A suitable serial bus may be a RS-232 bus. Alternatively, an electrical cable links the hand holdable peripheral to the computer or remote sound data storage device. A suitable wireless serial link is a serial infrared link.

In some embodiments, the peripheral may incorporate another type of peripheral such as a mouse, track ball or other pointing device or a keyboard. If the peripheral incorporates a mouse, for example, the switches of the sound compression/decompression peripheral are provided on the mouse so that the thumb or a finger of a hand manipulating the mouse can operate the sound compression/decompression peripheral switches. The microphone and/or speaker of the sound compression/decompression peripheral is in some embodiments disposed on a bottom or top surface of the mouse so that speech is recorded by lifting the mouse and speaking into the bottom or top surface of the mouse with the speaker facing the user. If the peripheral incorporates a keyboard, for example, the switches of the sound compression/decompression peripheral are spaced from the other keys on the keyboard or otherwise identified from the other keys on the keyboard so that the difference in function between the other keys on the keyboard and the switches of the sound compression/decompression peripheral is readily apparent to the user.

BRIEF DESCRIPTION OF THE DRAWINGS

FIGS. 5A–5I are circuit diagrams of the embodiment shown in FIG. 4.

DETAILED DESCRIPTION OF THE PREFERRED EMBODIMENTS

Figure 1A:
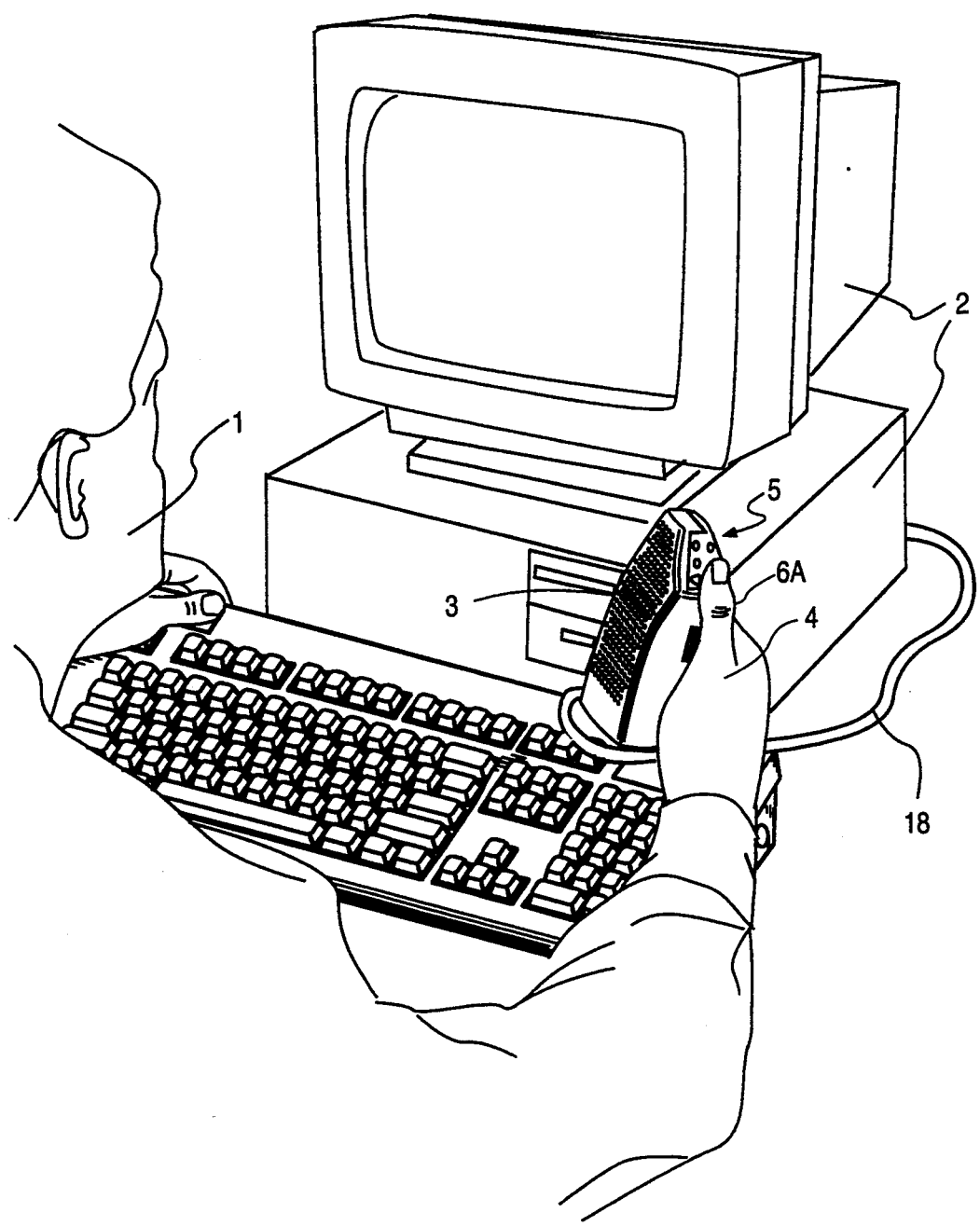
FIG. 1A is a perspective view of a user using one embodiment of a peripheral according to the present invention wherein hand operable switches are operated by a thumb of a hand grasping the peripheral.

FIG. 1A is a perspective view showing a user 1 in front of a personal computer 2. The user is grasping a hand holdable peripheral 3 in the palm of one of the user's hands 4 so that six switches 5 are operable by the thumb 6A of hand 4.

Figure 1B:
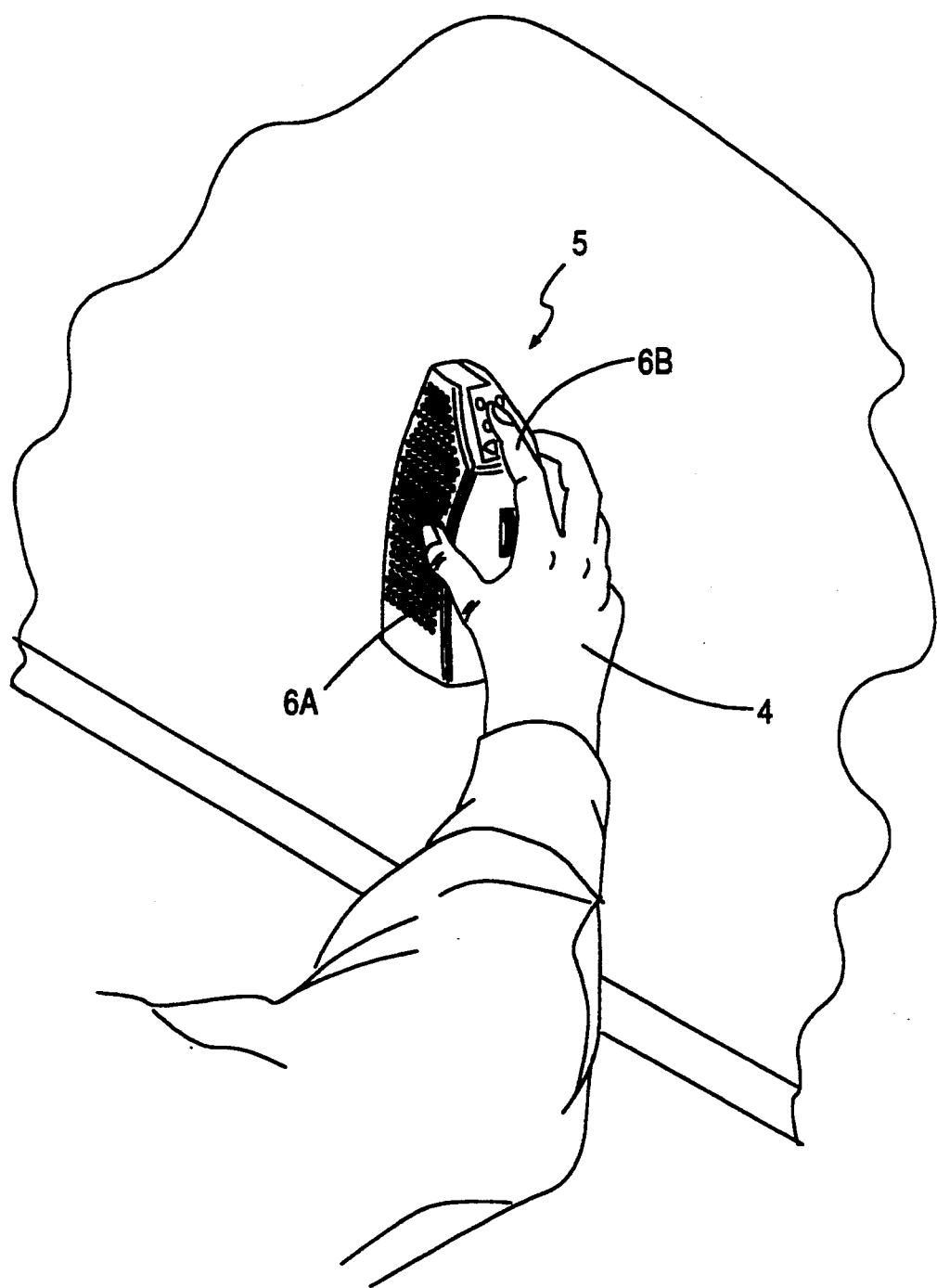
FIG. 1B is a perspective view of a user using the embodiment of the peripheral of FIGS. 1A and 1B wherein the hand operable switches are operated by an index finger of a hand grasping the peripheral.

FIG. 1B is a perspective view of a user using the embodiment of the peripheral of FIG. 1A wherein the hand operable switches 5 are operated by an index finger 6B of a hand 4 grasping the peripheral. The peripheral rests on a surface when grasped as shown in FIG. 1B or may be grasped by hand 4 so that the peripheral does not rest on any surface.

Figure 2:
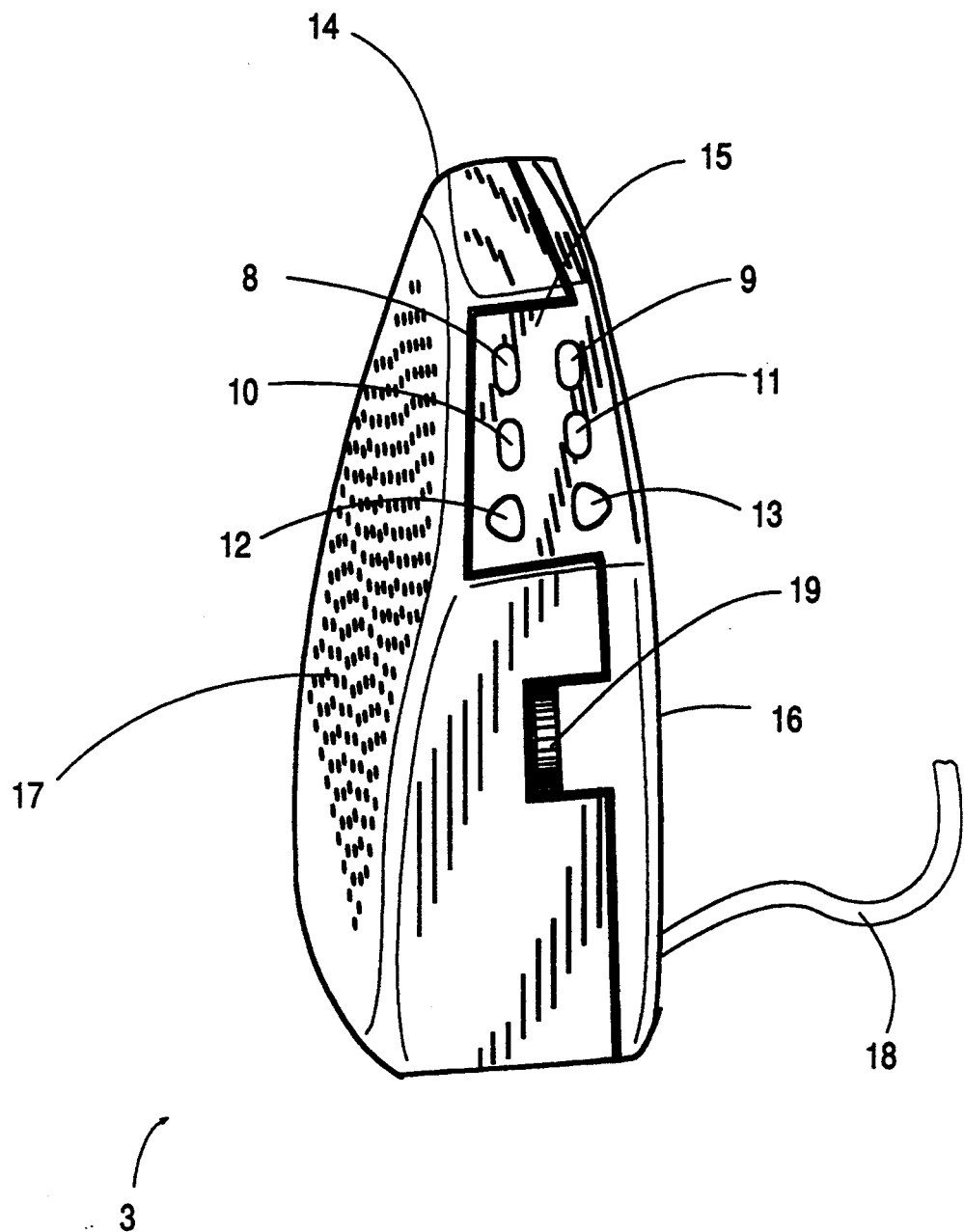
FIG. 2 is a perspective view of the embodiment shown in FIGS. 1A and 1B.

FIG. 2 is a perspective view of the hand holdable peripheral 3 of FIGS. 1A and 1B showing the six switches: a "STOP" switch 8, a "PLAY" switch 9, a "RECORD" switch 10, a "PAUSE" switch 11, a "REWIND" switch 12, and a "FAST FORWARD" switch 13. A housing 14, such as a plastic housing, of the hand holdable peripheral 3 comprises a first surface 16 which substantially faces the palm of hand 4 of the user 1 when the hand holdable peripheral is grasped by the user; a second surface 17 which faces substantially in a direction opposite first surface 16 when the hand holdable peripheral is grasped by the user; and a third surface 15 from which switches 8, 9, 10, 11, 12 and 13 protrude. Second surface 17 may have numerous holes which facilitate sound from a speaker inside the housing emanating from the hand holdable peripheral. The peripheral 3 is connected to the personal computer 2 via a cable 18.

Figure 3:
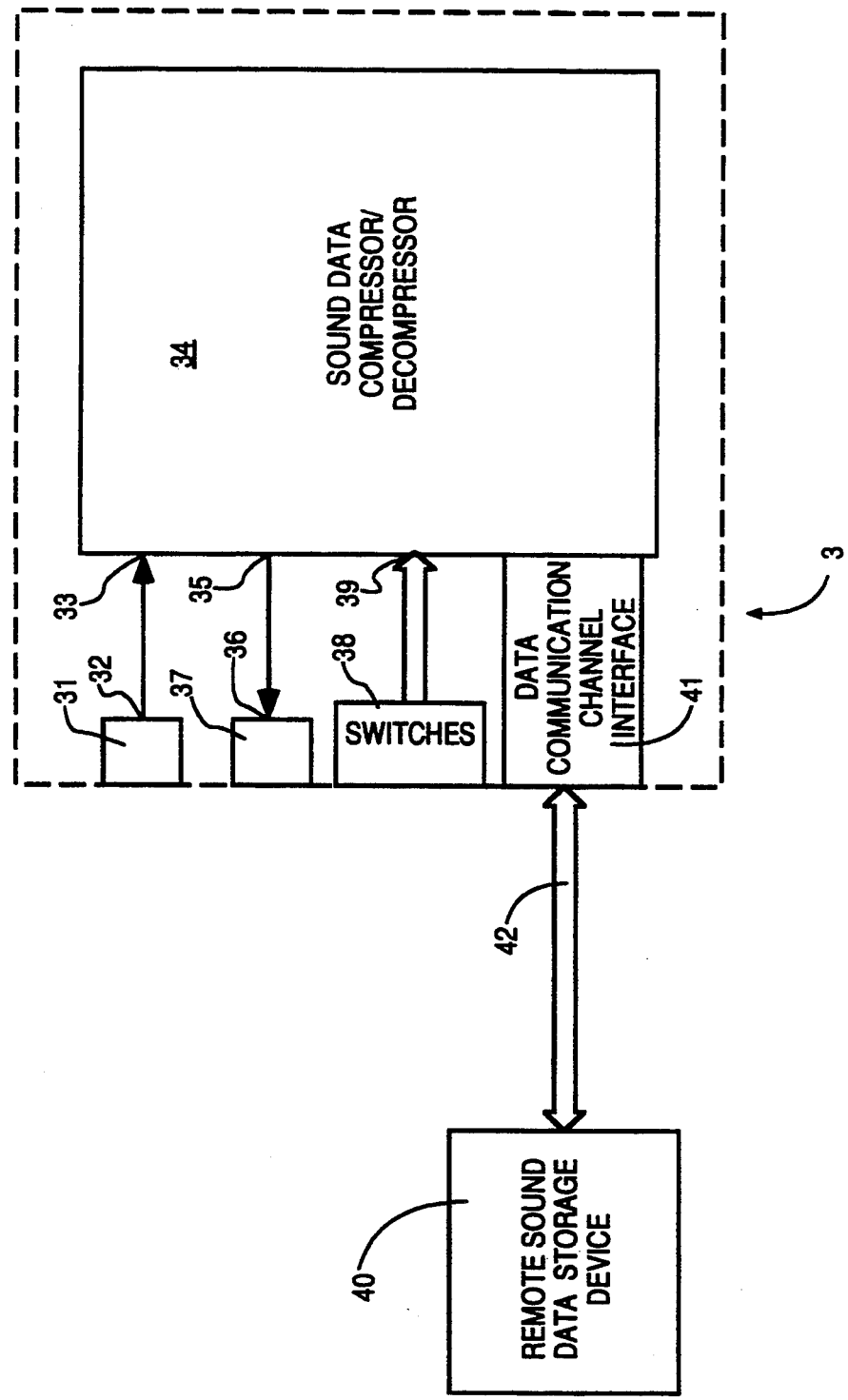
FIG. 3 is a high level block diagram of one embodiment according to the present invention.

FIG. 3 is a high level block diagram of one embodiment of peripheral 3. An output 32 of a sound input transducer 31 is coupled to an input 33 of a sound data compressor/decompressor 34. In some embodiments, sound input transducer 31 may be a microphone. In other embodiments, sound input transducer 31 may be another type of transducer which converts sound into electrical signals indicative of sound incident on the input transducer. In still other embodiments, sound input transducer 31 may be replaced by a connector for receiving electrical signals indicative of a sound. Such a connector may, for example, be a telephone interface to a telephone jack.

An output 35 of sound data compressor/decompressor 34 is coupled to an input 36 of a sound output transducer 37. Sound output transducer 37 may, for example, be a speaker. In other embodiments, sound output transducer 37 may be another type of transducer which converts electrical signals indicative of sound into corresponding sound waves. In still other embodiments, sound output transducer 37 may be replaced by a connector for outputting electrical signals indicative of sound waves. Such a connector may, for example, be a telephone interface to a telephone jack.

A plurality of switches 38 are coupled to an input 39 of the sound data compressor/decompressor 34. These switches 38 may, for example, be push activated switches (or keys, a key is a type of hand operable, push activated switch), each of which either makes or breaks an electrical connection when it is depressed. In some embodiments, switches 38 are hand operable push activated switches which can be operated by the thumb or fingers of a hand grasping the peripheral. Although push activated switches are described, other suitable types of electrical switches may be used. A sliding switch or multiple sliding switches may, for example, be used.

The sound data compressor/decompressor 34 is coupled to a remote sound data storage device 40 via a data communication channel interface 41 of a data communication channel 42. In some embodiments, the remote sound data storage device 40 is a mass data storage device such as a hard disk. Such a hard disk may be part of a personal computer. In some embodiments, the data communication channel interface 41 is an interface for coupling the peripheral 3 to a serial bus such as an RS-232 serial bus. In other embodiments, the data communication channel interface 41 is an interface for coupling the peripheral 3 to the remote sound data storage device 40 via a wireless link such as an infrared link. In still other embodiments, the data communication channel interface 41 is an interface for connecting the peripheral 3 to the remote sound data storage device 40 via a parallel bus.

Accordingly, a user of the peripheral can depress one of the switches 38 and cause incoming sound waves incident on sound input transducer 31 to be converted into analog form by sound input transducer 31, digitized and compressed by the sound data compressor/decompressor 34, transferred to the remote data storage device 40 via the data communication channel interface 41 and data communication channel 42, and stored in the remote sound data storage device 40. Similarly, the user can depress another of the switches 38 and cause stored compressed sound data stored in the remote sound data storage device 40 to be retrieved, transferred across the data communication channel 42 to the sound data compressor/decompressor 34, decompressed and converted into analog form by the sound data compressor/decompressor 34, and output from the sound output transducer 37 as sound waves.

Figure 4:
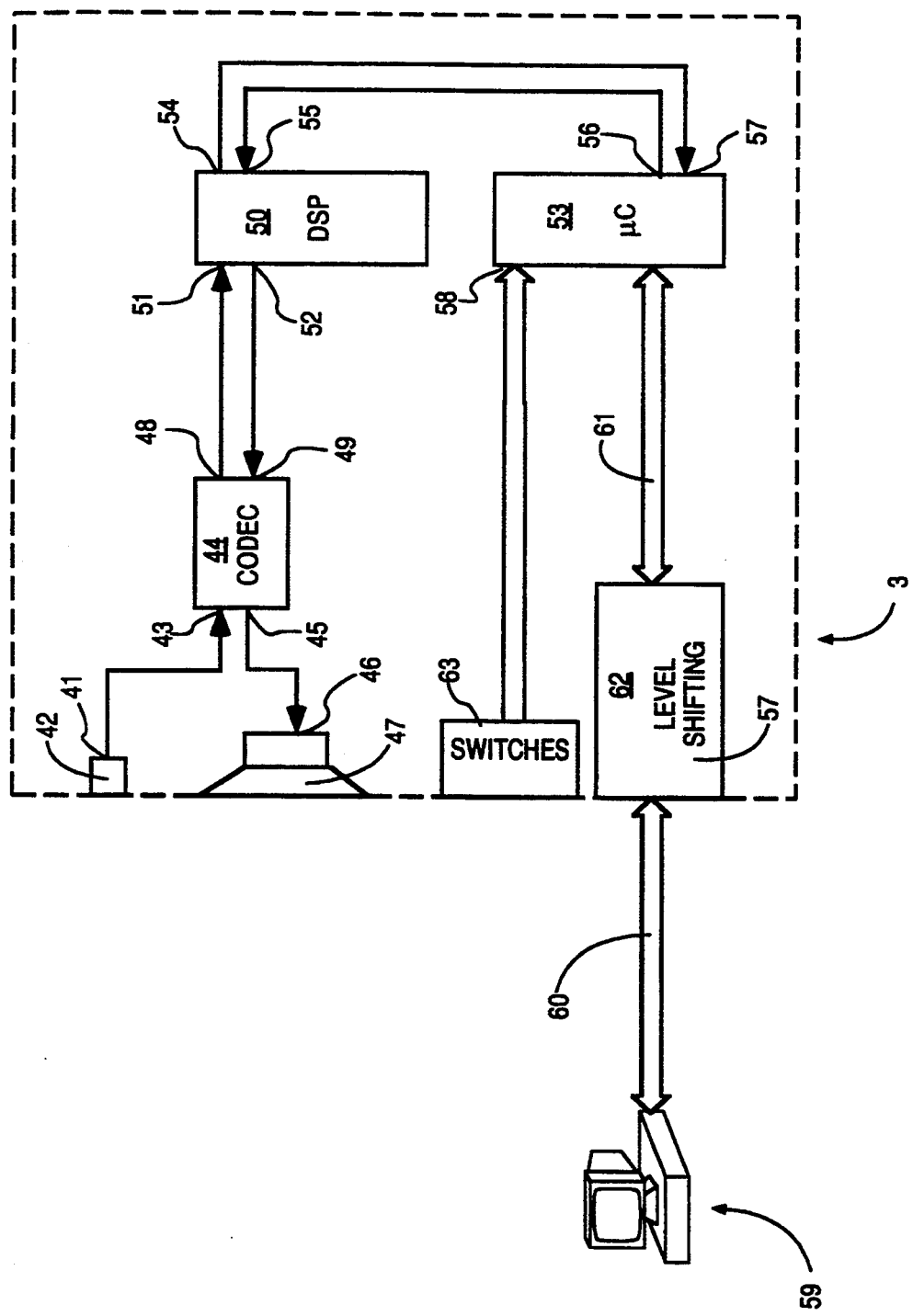
FIG. 4 is a block diagram of another embodiment according to the present invention.
Figure 5A:
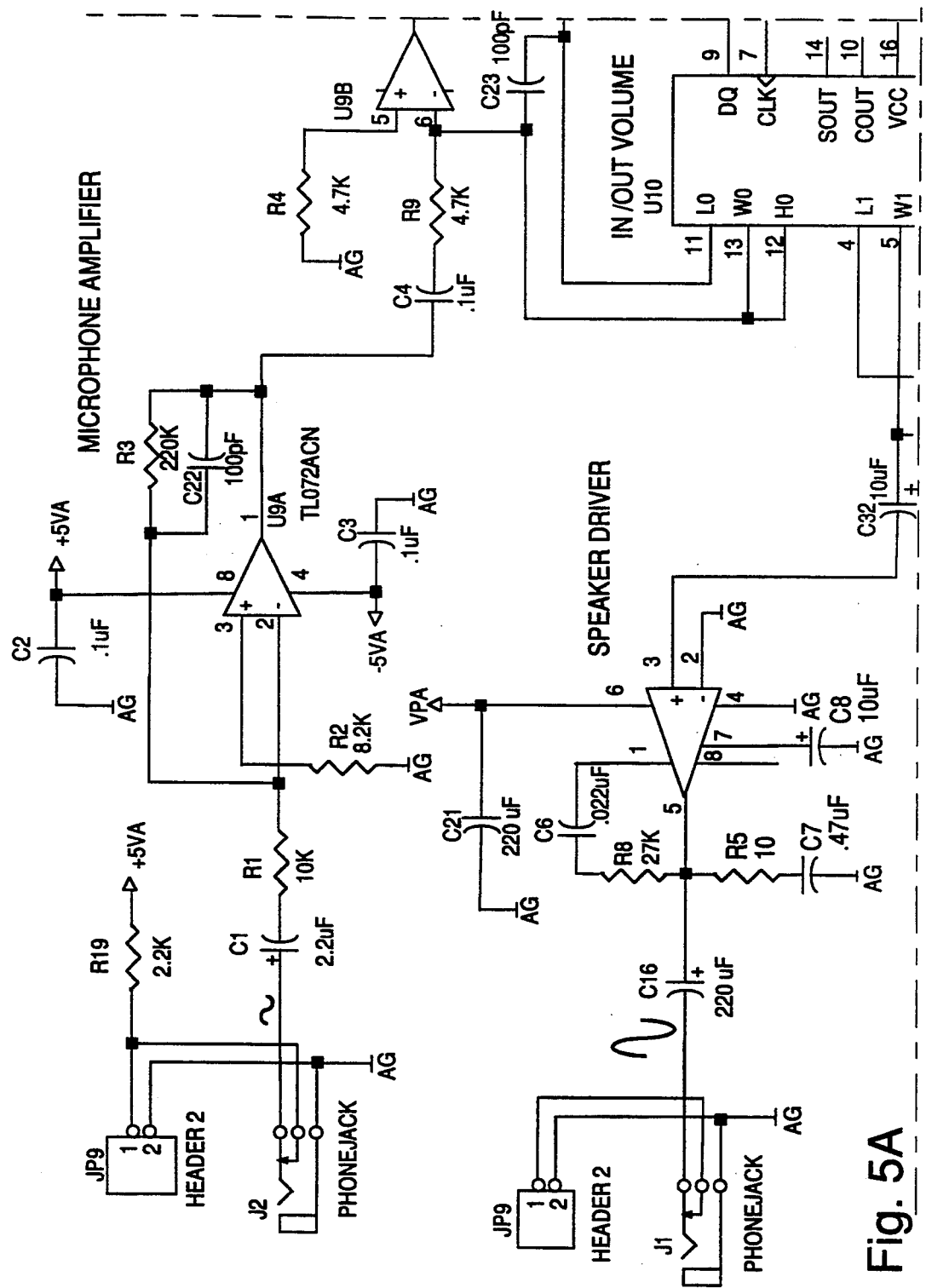
Figure 5B:
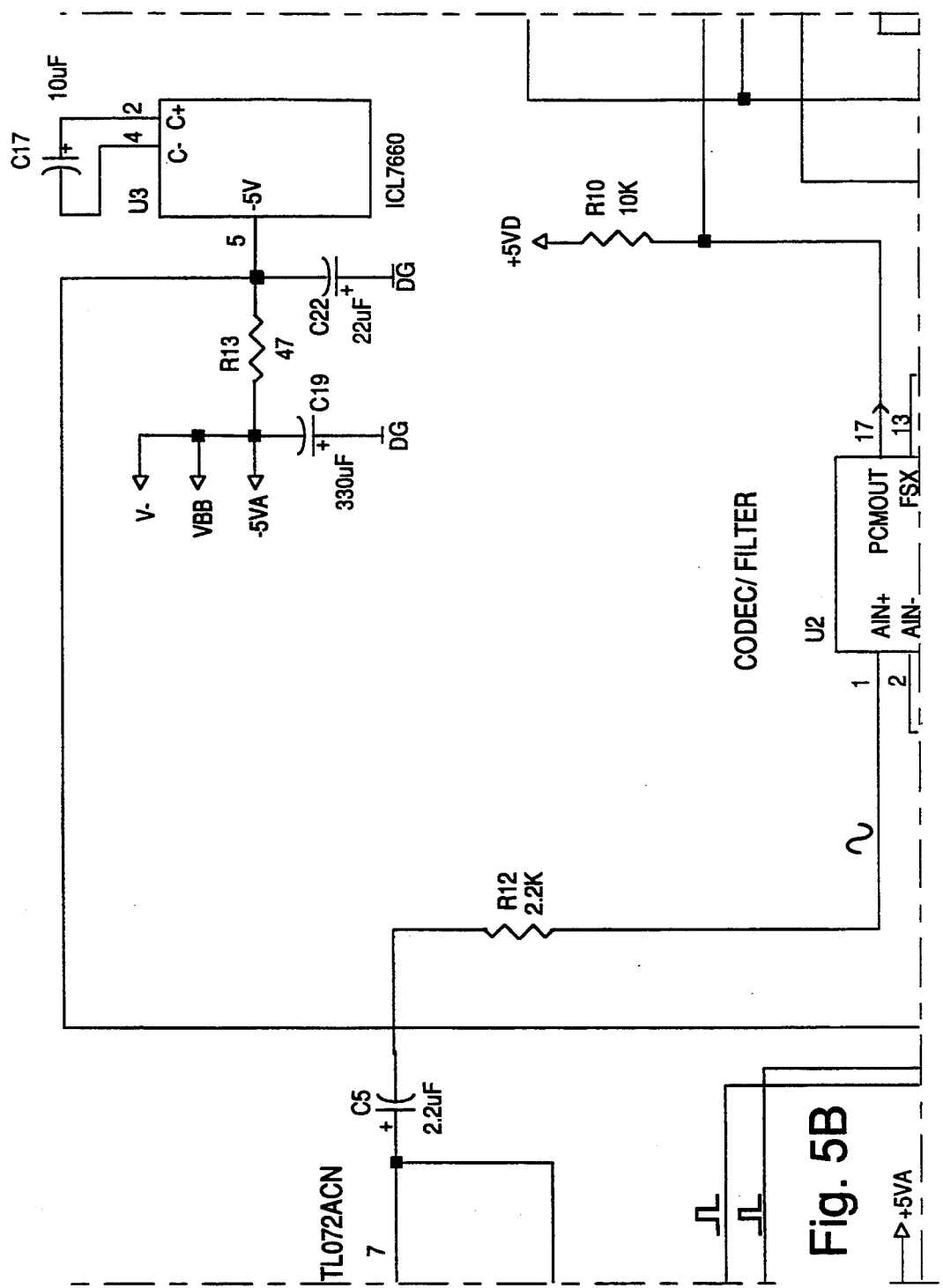
Figure 5D:
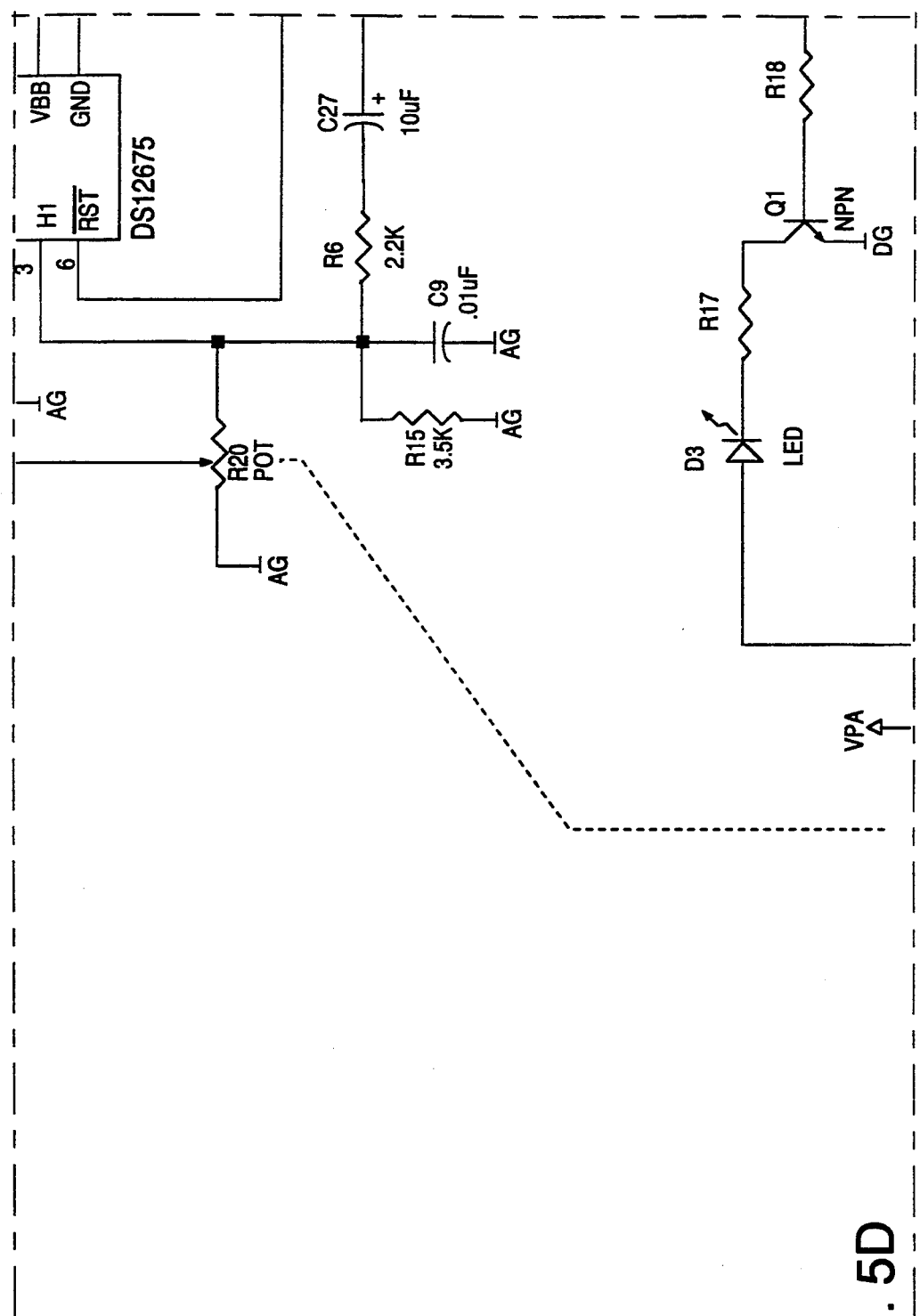
Figure 5E:
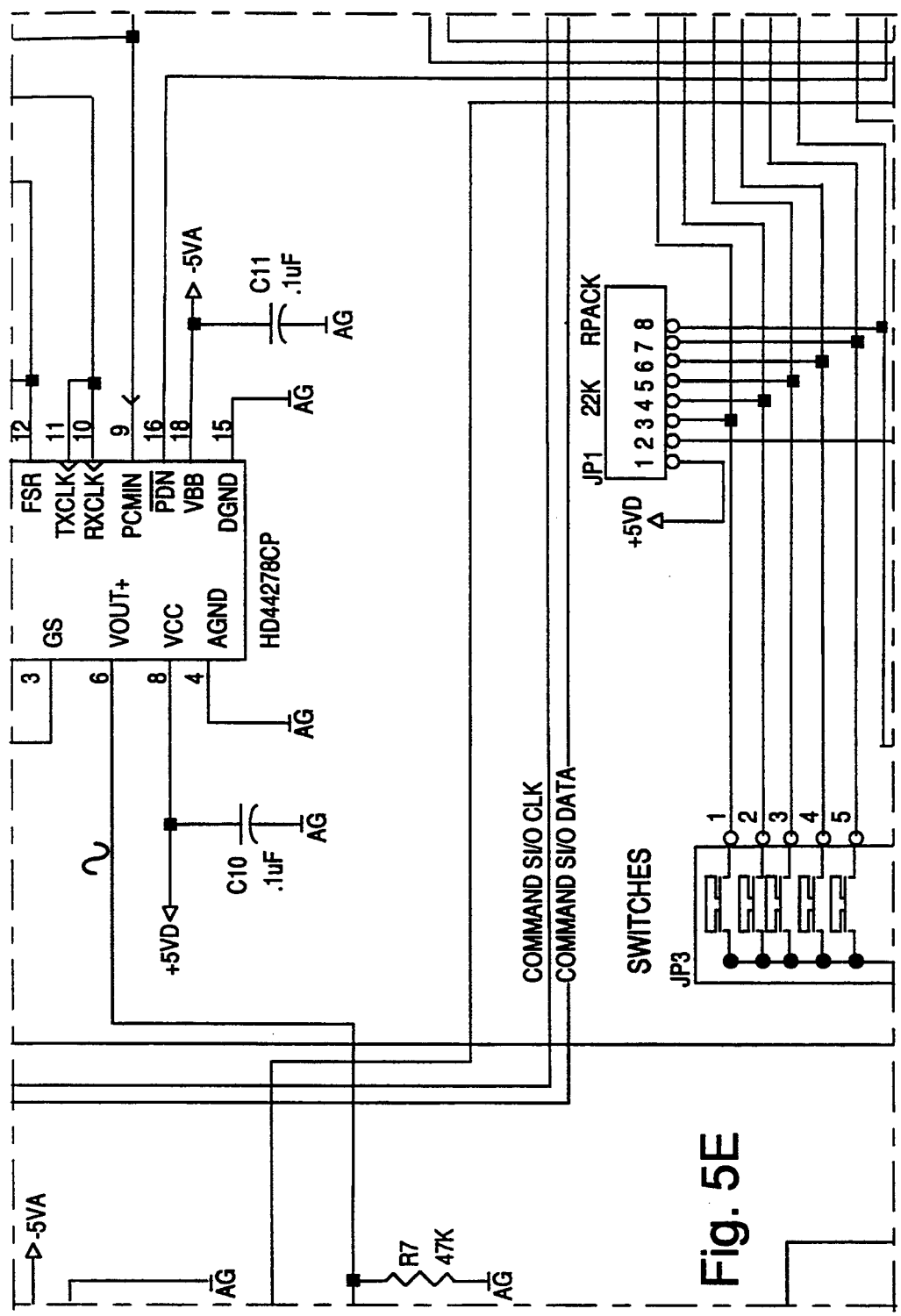
Figure 5F:
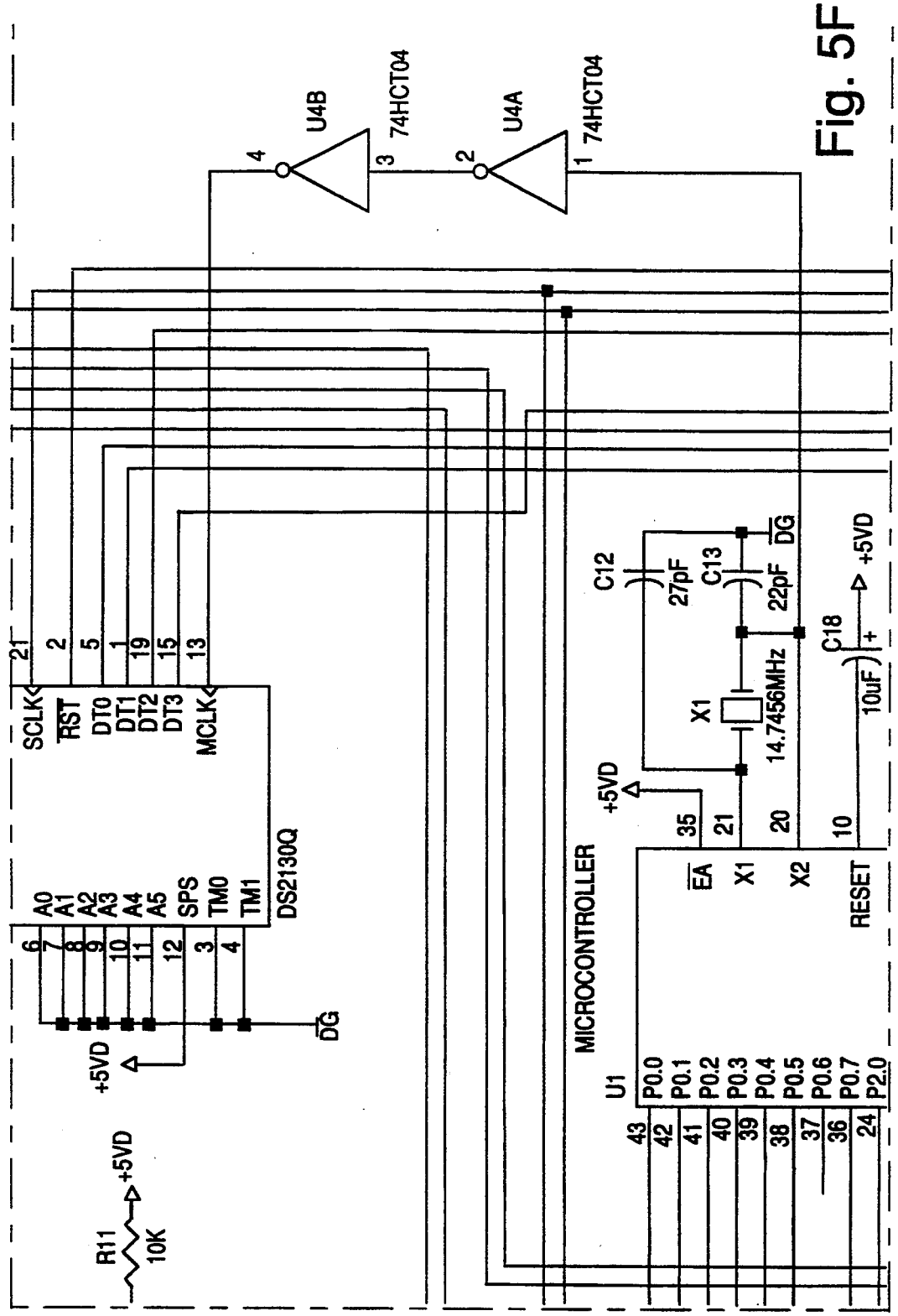
Figure 5G:
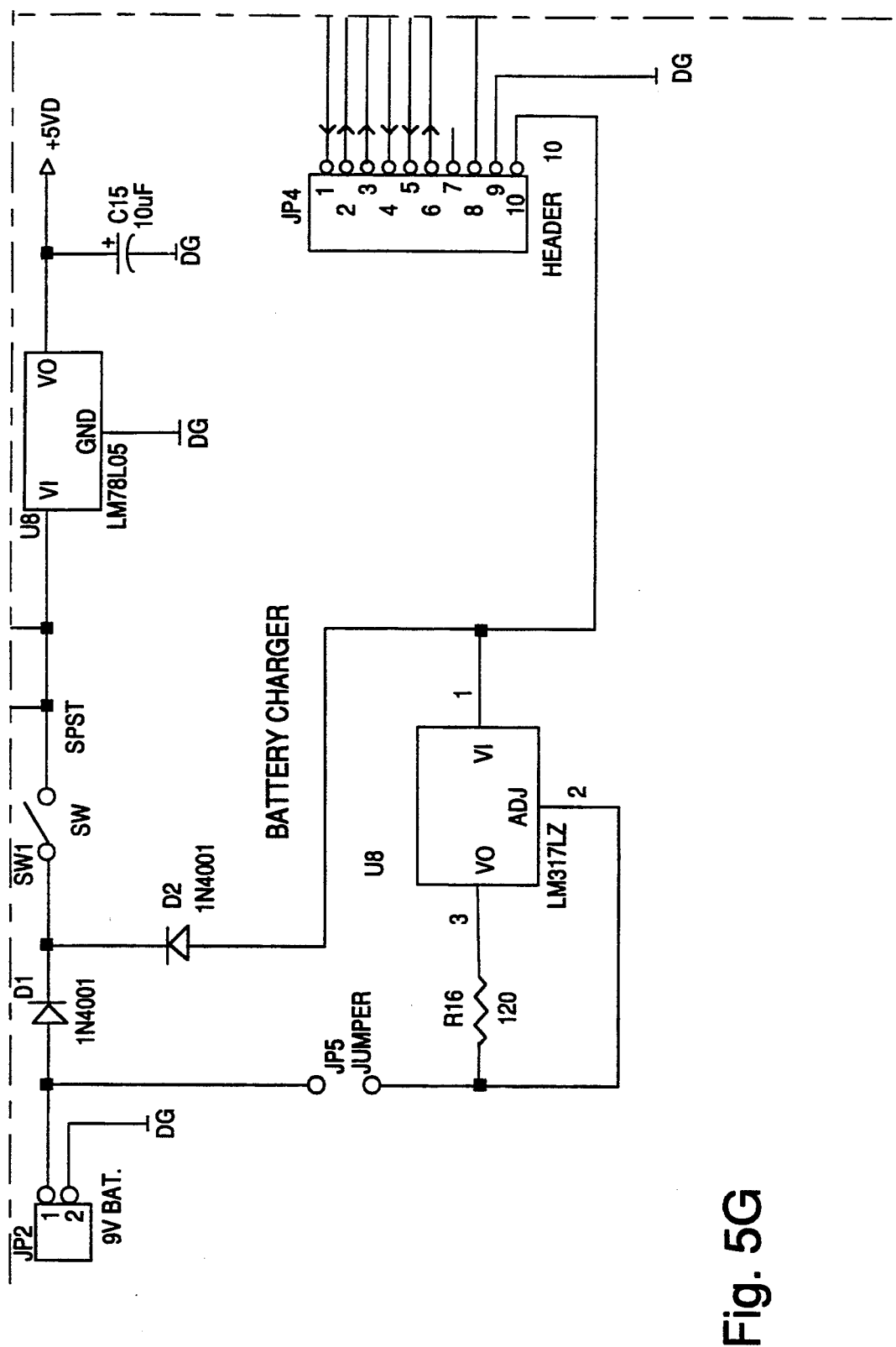
Figure 5H:
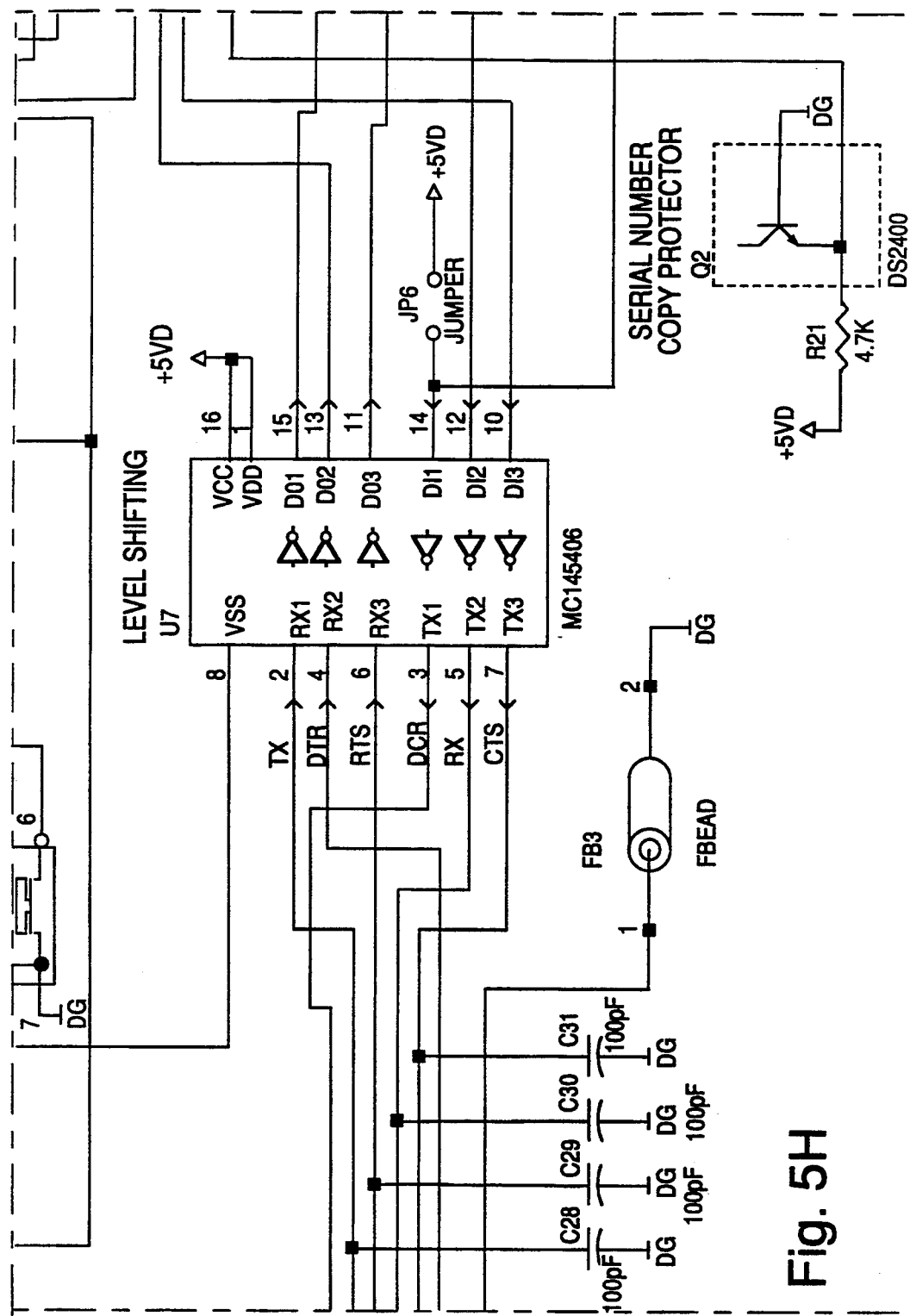
Figure 51:
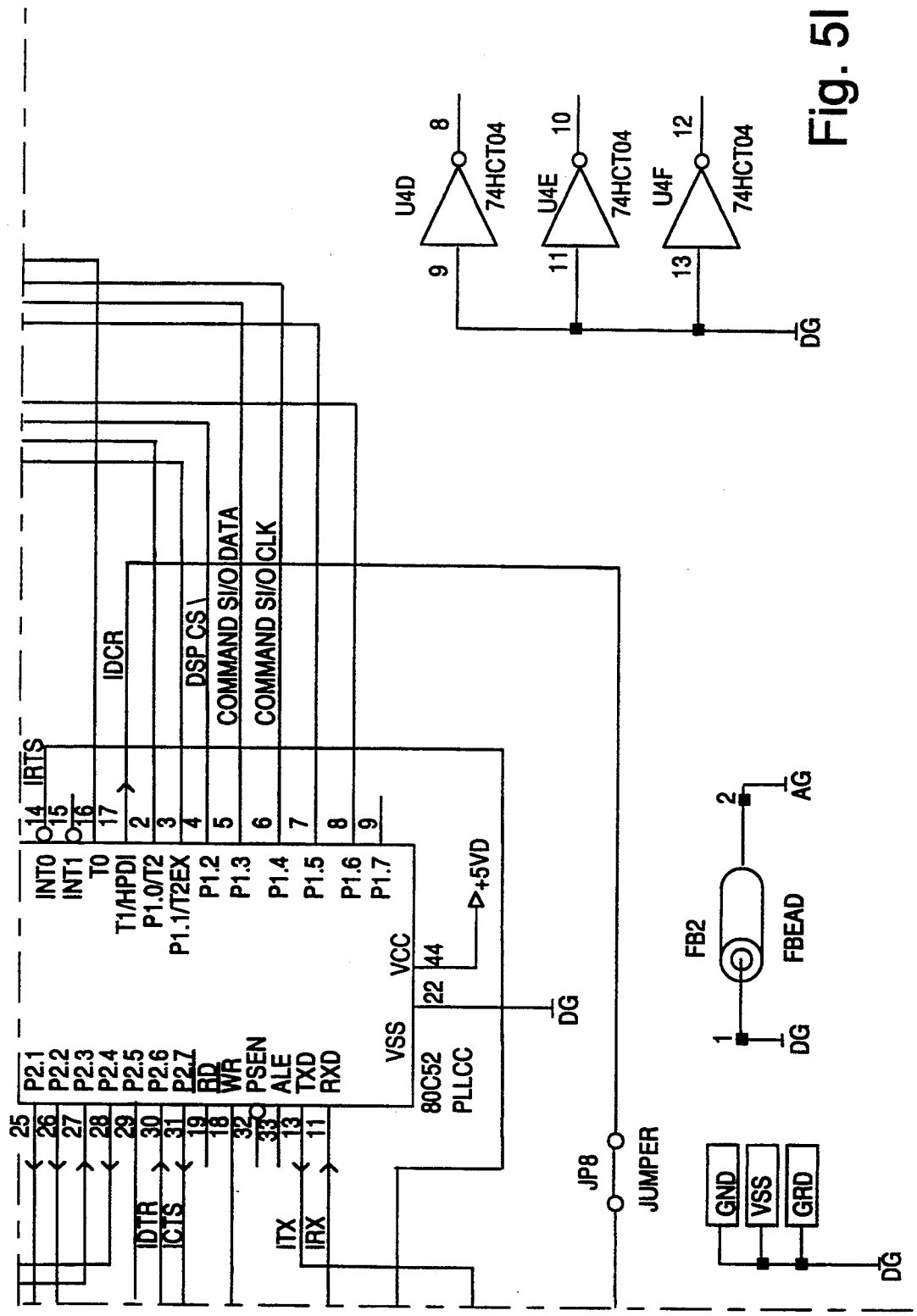

FIG. 4 is a lower level block diagram of one possible embodiment of the peripheral 3 of FIG. 3. The contents of the peripheral 3 are indicated by a dashed line. An output 41 of a microphone 42 is coupled to an analog input 43 of a encoder/decoder 44 (hereinafter referred to as a codec). An analog output 45 of codec 44 is coupled to an input 46 of a speaker 47. Codec 44 may, for example, be a μLaw codec which encodes analog signals present on analog input 43 into corresponding pulse code modulated signals which are output from an encoded output 48. Such a μLaw codec 44 also receives pulse code modulated signals present on an encoded input 49 and decodes these pulse code modulated signals into corresponding analog signals which are output from the μLaw codec on analog output 45.

A digital signal processor 50 communicates with the codec 44 by pulse code modulated signals. Digital signal processor 50 receives pulse code modulated sound signals from codec 44 on encoded input 51, compresses this sound information according to an adaptive differential pulse code modulation compression method (hereinafter referred to as a ADPCM compression method), and outputs the resulting compressed sound data in serial form to a microcontroller 53 via a serial output 54 of the digital signal processor 50. Digital signal processor 50 also receives previously compressed sound data in serial form from microcontroller 53 on serial input 55, decompresses the compressed sound data, and outputs the decompressed sound data in pulse code modulated form to codec 44 from encoded output 52 of the digital signal processor 50.

μLaw Pulse code modulation is used between the digital signal processor 50 and codec 44 in order to obtain a larger dynamic range of analog-to-digital conversion than would be possible using an analog-to-digital converter of the same approximate cost. Codecs costing approximately $4.00 are available which can output the equivalent of 12 bits of linear dynamic range. A suitable 12-bit analog-to-digital converter capable of realizing the same 12 bits of dynamic range presently costs approximately $12.00.

Microcontroller 53 receives compressed sound data in serial form from digital signal processor 50 on serial input 57 and stores this compressed sound data in a buffer inside microcontroller 53. Microcontroller 53 may then periodically transfer compressed sound data from the buffer to a remote sound data storage device such as a personal computer 59 via a data communication channel 60. In the embodiment shown in FIG. 4, the microcontroller 53 outputs compressed sound data onto an intermediate communication channel 61. Level shifting circuitry 62 converts the digital logic voltage level signals output onto intermediate data communication channel 61 by microcontroller 53 into the RS-232 voltage levels suitable for data communication channel 60. Level shifting circuitry also converts RS-232 voltage level signals present on data communication channel 60 into digital logic voltage level signals which can be received by microcontroller 53.

Microcontroller 53 also monitors the status of a plurality of switches 63 using an input port 58. When microcontroller 53 detects a change in the status of switches 63, microcontroller 53 can change its operation based on that changed status and/or can relay the status of switches 63 to personal computer 59.

Microcontroller 53 may also serve as a buffer of compressed sound data when the personal computer 59 is transferring compressed sound data to the peripheral 3 to be decompressed and output from the peripheral as sound waves. In such transfers, the personal computer 59 may periodically write previously compressed sound data into a buffer inside microcontroller 53 via data communication channel 60, level shifting circuitry 62, and intermediate data communication channel 61. Microcontroller 53 is therefore able to supply the digital signal processor 50 with previously compressed sound data from its buffer as the digital signal processor decompresses sound data. Because the transfer of compressed data from the personal computer to the peripheral is much faster than the decompression of that compressed sound data by the peripheral, the personal computer is freed to perform other functions after a transfer of compressed sound data as long as the personal computer places compressed sound data into the microcontroller's buffer often enough that the buffer does not empty.

FIG. 5 is a circuit diagram showing one specific embodiment of the peripheral of FIG. 4 which operates with a personal computer such as an IBM PC or an IBM PC compatible computer. The six resistors of a resistor pack JP1 keep respective ones of the six inputs of an input port P0 of a 80C52 microcontroller U1 pulled up to +5 volts when none of the six switches of JP3 is pressed. In the event that one of the six switches of JP3 is depressed, however, the voltage on a corresponding input of input port P0 is pulled down to a low voltage level.

Microcontroller U1 has on-board program memory, on-board random-access-memory (hereafter referred to as RAM), on-board timers, as well as on-board serial bus communication circuitry for driving output serial data onto output TXD pin 13 and for receiving input serial data on input RXD pin 11. A program running this microcontroller periodically polls the voltages on the six inputs of port P0 to determine when a switch is pressed or released. When microcontroller U1 detects a change in the voltages read on port P0, microcontroller U1 forwards this information to a personal computer (not shown) as keystroke status information. The multiple signal lines used to communicate between the microcontroller U1 and the personal computer are listed below in Table 1.

TABLE 1

| SIGNAL LINE | DETAILS |
|---|---|
| DCR | – This line is a unidirectional line from the peripheral to the personal computer.<br>– The peripheral asserts this line low to alert the personal computer that the peripheral has keystroke status information to send to the personal computer. |
| DTR | – This line is a unidirectional line from the personal computer to the peripheral.<br>– The personal computer asserts this line low to alert the peripheral that it is ready to receive keystroke status information from the peripheral.<br>– The personal computer may also assert this line to alert the peripheral that it is ready to receive a packet of compressed sound data from the peripheral. |
| TX | – This line is a unidirectional line from the peripheral to the personal computer.<br>– The peripheral uses this line to transmit serial data to the personal computer. Keystroke status information and packets of compressed sound data may be transmitted to the personal computer over this line. |
| RTS | – This line is a unidirectional line from the personal computer to the peripheral.<br>– The personal computer uses this line to alert the peripheral that the computer has a command to transmit to the peripheral.<br>– The personal computer also may use this line to alert the peripheral that the computer has a packet of compressed data to |

TABLE 1-continued

| SIGNAL LINE | DETAILS |
|---|---|
| | transmit to the peripheral. |
| CTS | – This line is a unidirectional line from the peripheral to the personal computer.<br>– The peripheral uses this line to alert the personal computer that it is ready to receive a command from the personal computer.<br>– The peripheral also may use this line to alert the personal computer that it is ready to receive a packet of compressed sound data from the personal computer. |
| RX | – This line is a unidirectional line from the personal computer to the peripheral.<br>– The personal computer uses this line to transmit serial data to the peripheral. Commands and compressed sound data may be transmitted to the peripheral over this line. |

After microcontroller U1 has detected a change in the status of switches JP3, the microcontroller U1 forwards this keystroke (switch) status information to the personal computer by first sending a keystroke ready signal via line DCR to the personal computer. A low level on line DCR indicates to the personal computer that a switch on the peripheral has been pressed or released and that the peripheral is requesting to send keystroke status information to the personal computer via serial line RXD. Microcontroller U1 therefore drives intermediate DCR line to a low voltage level by driving microcontroller pin 11 low. This low level signal on intermediate line DCR is converted into a high RS-232 voltage level on line DCR by one of the RS-232 level shifting buffers inside level shifter chip U7. DCR pin 1 of an RS-232 connector JP4 is therefore driven with the high RS-232 voltage level so that this signal can be supplied to the personal computer via a dedicated line DCR in a cable (not shown).

The personal computer senses the high level on the DCR line using a 8250/16450 universal asynchronous transmitter/receiver (UART) (not shown) which is coupled to the electrical cable extending from the peripheral. When the 8250/16450 UART senses the voltage on line DCR at a high voltage, the UART generates a hardware interrupt signal to the personal computer's microprocessor. Because the microprocessor of the personal computer may then be running application software such as a word processing program, a spreadsheet program, a game program, a mail program, et cetera, at the time of the hardware interrupt, the hardware interrupt causes the microprocessor to suspend execution of the application program and to jump into a driver program. After interrogating the UART to determine which interrupt line leading into the UART caused the interrupt, the driver program jumps to a memory location in the interrupt routine for that particular interrupt line to be serviced.

In the case of the DCR line being asserted by the peripheral of FIG. 5, the particular interrupt routine inside the driver program to which the microprocessor jumps is an interrupt routine for handling keystrokes from the hand holdable peripheral. This particular interrupt routine, however, contains a memory address to the application software. A software interrupt instruction is a special instruction, the execution of which causes the microprocessor to jump to a location given by the software interrupt instruction itself. The application software tells the driver the memory address to jump to when a key is pressed via this software interrupt instruction. Thus commands and data are passed to/from the driver/application. The keystroke interrupt routine of the driver program causes the microprocessor to jump back into the application software to this specific location where a routine for handling keystrokes is located. By using the definable memory address in the driver's keystroke routine, the application software itself can contain the routine which determines how pressing and releasing a particular switch is to be handled. The functionality of a particular switch on the hand holdable peripheral is therefore determined by the application software and not by the driver program. Accordingly, a given switch may have a first function when pressed during the execution of a first application program whereas that same switch may have a second function when pressed during the execution of a second application program.

In order for the driver program to be able to vector the microprocessor to the appropriate address in the application software where the keystroke handling routine is located, however, the driver program itself must contain that particular address. Because application software may be loaded into and executed from different locations in the personal computer's memory, the driver program must be updated to contain the correct address of the application program. Accordingly, when execution of the application software first begins, the application software itself may place the starting address of its keystroke handling routine into a memory location of a parameter block and then issue a software interrupt routine. This software interrupt routine may then cause program execution to jump into an initialization section of the driver program where the driver program reads the new address from the parameter block. After the driver program has read the address of the keystroke handling routine from the parameter block, the driver program can cause the microprocessor to jump back into the application program.

Once the low-going DCR line has caused the microprocessor in the personal computer to vector to the keystroke handling routine of the driver program, the keystroke handling routine of the driver program readies memory resources for accepting keystroke status information from the peripheral. After the resources are ready, the driver program causes the UART of the personal computer to send an acknowledge signal back to the peripheral via line DTR to alert the peripheral that the personal computer is now ready to receive the keystroke status information. The high signal on line DTR is conducted through the cable, to pin 6 of connector JP4 of the peripheral, is level shifted from RS-232 levels to a digital low voltage level by a buffer in buffer chip U7, and is received as intermediate signal IDTR by microcontroller U1 on input P2.6 pin 30.

When microcontroller U1 senses the IDTR line at a low digital voltage level, the program running in microcontroller U1 causes the keystroke (switch) status information to be output in serial form onto RXD pin 11. This keystroke status information is level shifted by RS-232 level shifting chip U7, is supplied on line RX to pin 4 of connector JP4, and is transmitted via the cable to the UART in the personal computer. After the UART has received the serial keystroke status information, the UART hardware interrupts the microprocessor out of its application software and into the driver program. The driver program reads the keystroke status information in parallel form from the UART and passes the switch status information to the application by updating a user defined memory location in the application software containing the keystroke status information. The application then performs whatever function is desired for the particular switch pressed or released. Accordingly, keystroke status information is simply passed through the microcontroller U1 and through the driver program to the application software so that the application software can determine what action is to be taken.

After the switch status information has been passed to the application program, the application program's keystroke handling routine may use a driver command so that the driver will cause the UART to assert a dedicated unidirectional line, the RTS line, high. Such a high on the RTS line alerts the peripheral that the personal computer has a command to send over serial line RXD to the microcontroller. After preparing to receive the command, microcontroller U1 asserts the CTS dedicated line low to alert the personal computer that the microcontroller is ready to receive the command. Upon sensing the CTS line low, the microprocessor of the personal computer again jumps through the driver program. The driver program can then control the UART to issue a command serially to microcontroller U1 across line RX, through level shifting chip U7, and the microcontroller U1 via line IRX. When microcontroller U1 receives the command on RXD pin 11, the firmware of the microcontroller recognizes the command and causes the appropriate action to be taken by the microcontroller.

Appendix A is a list of commands which may be passed from the personal computer to the microcontroller according to one embodiment of the invention. By the use of commands, the functionality of the switches on the peripheral is within the control of the application software. The microcontroller of the peripheral merely relays keystroke (switch) status information to the personal computer and responds to commands.

The operation of the specific embodiment of the peripheral shown in FIG. 5 is further explained in connection with the following operational example and in connection with the flow diagrams of FIGS. 6-13.

OPERATIONAL EXAMPLE

POWER ON RESET

Figure 6:
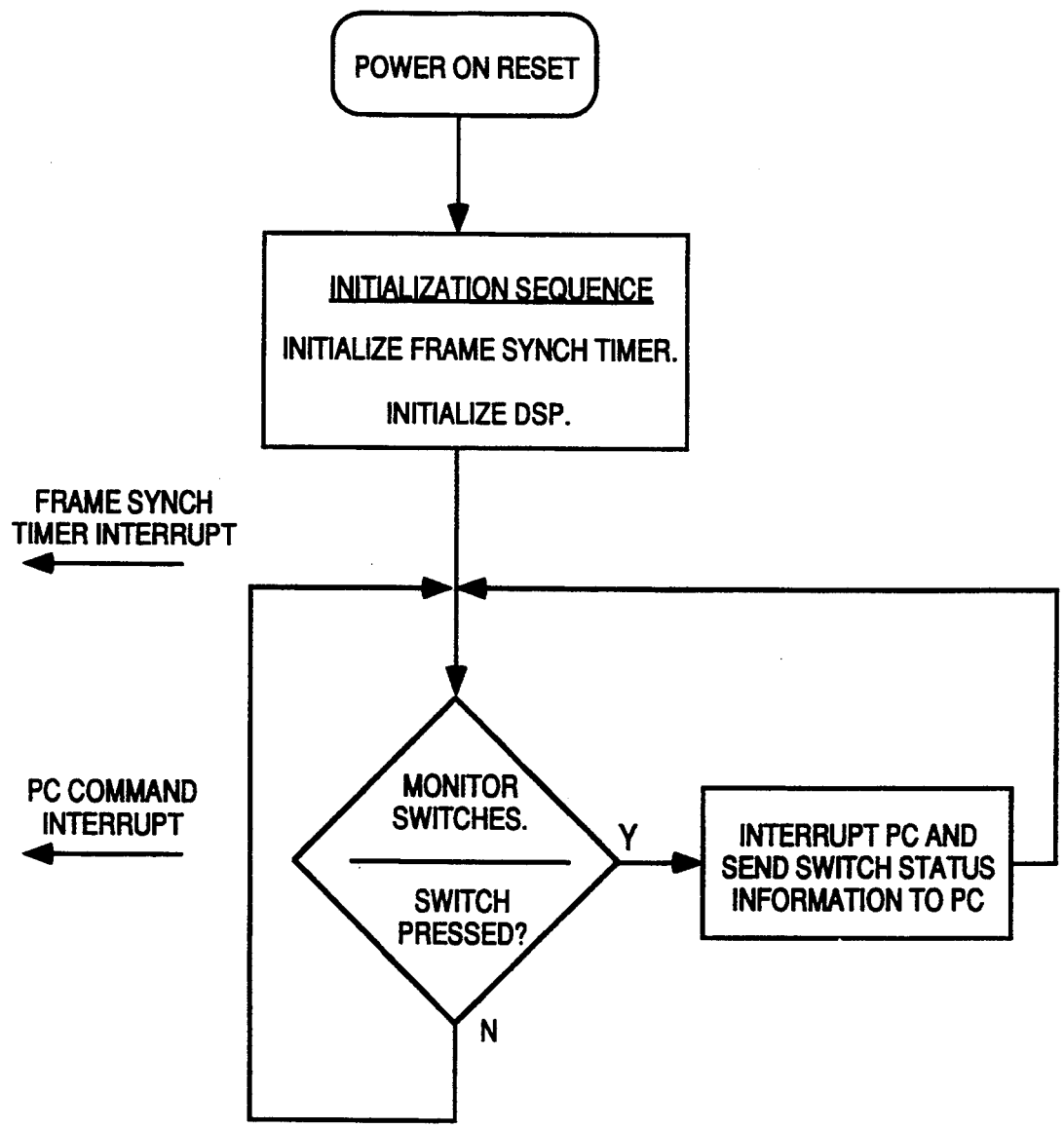
FIGS. 6–13 are flow diagrams showing the flow of the program executed in the microcontroller of the embodiment of FIG. 5.

FIG. 6 is a flow diagram showing the operation of the firmware executed in the microcontroller U1. When the +5 VD power supply rises to +5 volts when power is supplied to the peripheral, capacitor C18 is initially uncharged. Pin 10 of microcontroller U1 is therefore initially held high in a reset condition for a period of time until capacitor C18 is charged and pin 10 of the microcontroller reaches a low logic voltage level.

After the voltage on the reset pin 10 reaches a low voltage level, microcontroller U1 performs an initialization sequence. An on-board timer of the microcontroller is initialized and started so that the timer will interrupt the microcontroller with a frame synchronization timer interrupt every 125 microseconds (8 KHz). This frame synchronization timer interrupt is used to cause the microcontroller to service the digital signal processor (hereafter referred to as the DSP) U5 and the encoder/decoder (hereafter referred to as the codec) U2 at the appropriate time intervals. The initialization sequence also initializes the DSP by sending setup information to the DSP serially. Setup data is supplied to the DSP serially from microcontroller COMMAND_SI/O_DATA pin 5 and is clocked into the DSP U5 using microcontroller COMMAND_SI/O_CLK pin 6.

After performing this initialization sequence, microcontroller U1 monitors the switches JP3 by reading input port P0 on pins 38-43. If the value read from input port P0 differs from the previously read value, the microcontroller determines that a switch has been pressed or released. If a switch has been pressed or released, the microcontroller interrupts the personal computer as described above by asserting the DCR line low. Because the intermediate line IRTS is connected to an interrupt input INT0 pin 14 leading into microcontroller U1, the RTS response from the personal computer causes the microcontroller to enter a personal computer command interrupt routine. Once in the command interrupt routine, microcontroller U1 reads the command from the personal computer via line RX as described above and then returns from the interrupt routine to monitoring the switches JP3 as shown in FIG. 6. If, on the other hand, the microcontroller U1 determines that the value present on input port P0 has not changed, the microcontroller simply returns to monitoring the switches JP3.

Figure 7:
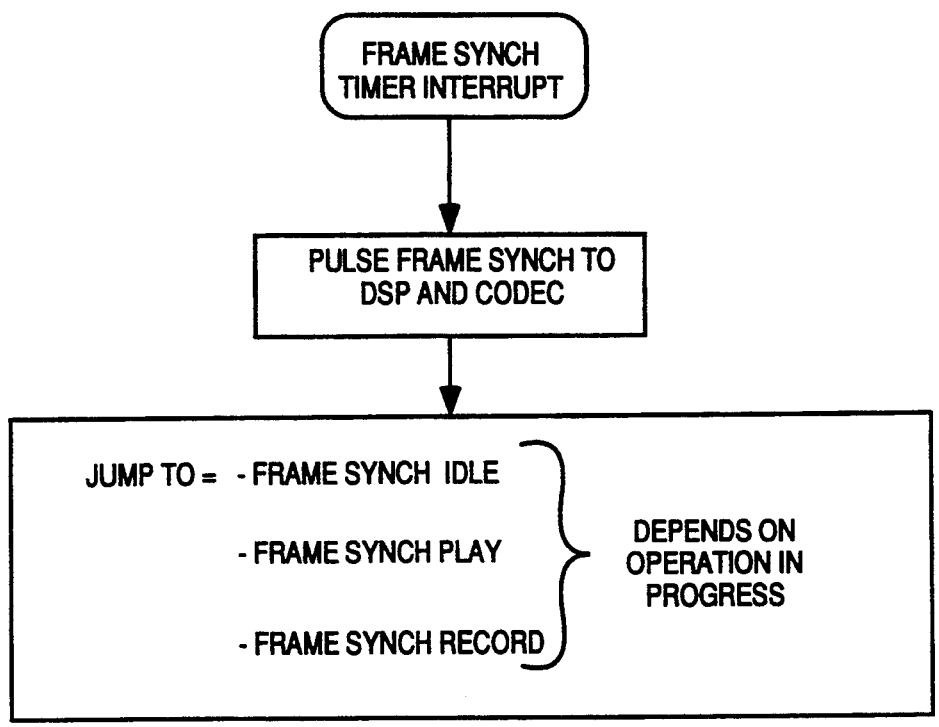

If after the monitoring of switches in FIG. 6 the frame synchronization timer expires and interrupts the microcontroller, firmware execution is interrupted from the flow of FIG. 6 and firmware execution then proceeds to the flow of FIG. 7. The microcontroller U1 therefore generates a frame synchronization pulse to the DSP U5 and codec U2 via output P2.2 pin 26. Accordingly, every 125 microseconds, microcontroller U1 is interrupted by the on-board frame synchronization timer and the microcontroller generates a frame synchronization pulse. All analog-to-digital conversions and all digital-to-analog conversion performed by the codec U2 as well as all compressions and decompressions performed by the DSP U5 are performed synchronously with respect to the frame synchronization signals generated by the microcontroller.

Because no switch has yet been pressed in the present operation example, however, the peripheral is in an idle state. Firmware execution therefore proceeds to the flow of FIG. 8. If a switch had been previously pressed and if the peripheral were playing compressed sound data, then firmware execution would proceed to the flow of FIG. 9. Similarly, if a switch had been previously pressed and if the peripheral were recording sound, then firmware execution would proceed to the flow of FIG. 10.

Figure 8:
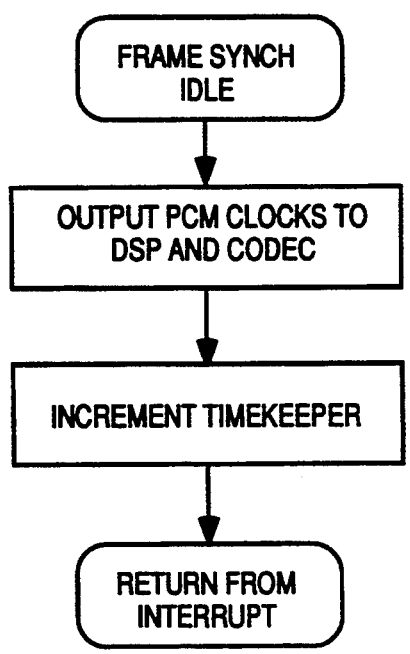

If the frame synchronization timer interrupt occurs when the peripheral is in the idle state, then firmware execution proceeds to the flow of FIG. 8. Eight pulse code modulated synchronization pulses are generated by the microcontroller from output P2.1 pin 25 for each frame synchronization signal output. It is with respect to these individual pulse code modulated pulses that the codec transmits pulse code modulated information to the DSP and that the DSP transmits pulse code modulated information to the codec. If, for example, DSP U5 is to output a decompressed value to codec U2, DSP U5 will synchronize the output of a pulse from PCMOUT pin 24 with the eight PCM synchronization pulses. By using the same PCM synchronization pulses and the PCM data pulses from the DSP U5 received on PCMIN pin 9 of codec U2, codec U2 is able to determine the value transmitted. One such pulse code modulated values are transmitted between the DSP U5 and the codec U2 in each frame synchronization period between successive frame synchronization pulses.

After these eight pulse code modulated synchronization pulses are output, a time keeper clock is incremented. This time keeper clock indicates the period of time that the peripheral has been operating. Firmware execution in the microcontroller then returns from the frame synchronization interrupt routine back to monitoring the switches as shown in FIG. 6.

PRESSING THE RECORD SWITCH

Figure 11:
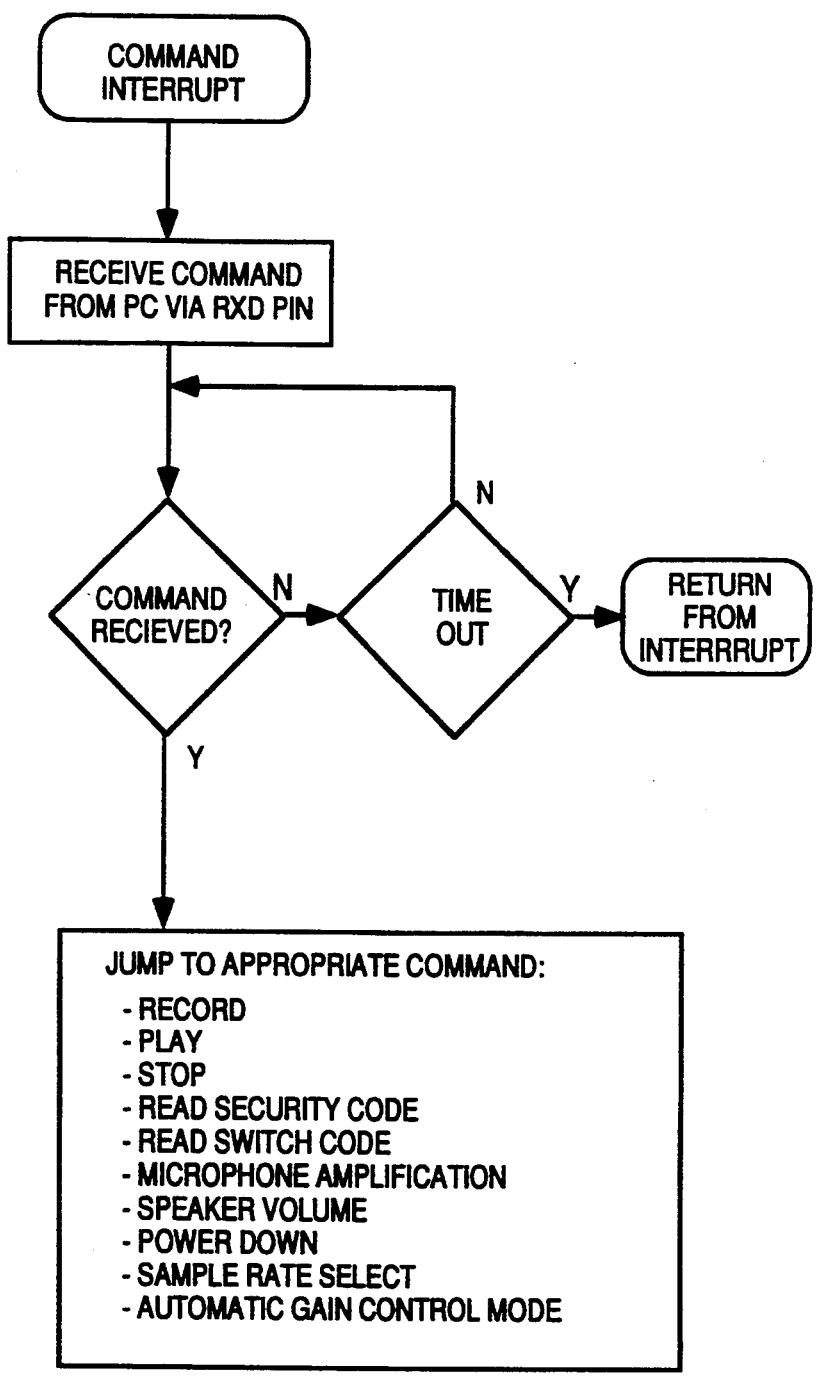
Figure 12:
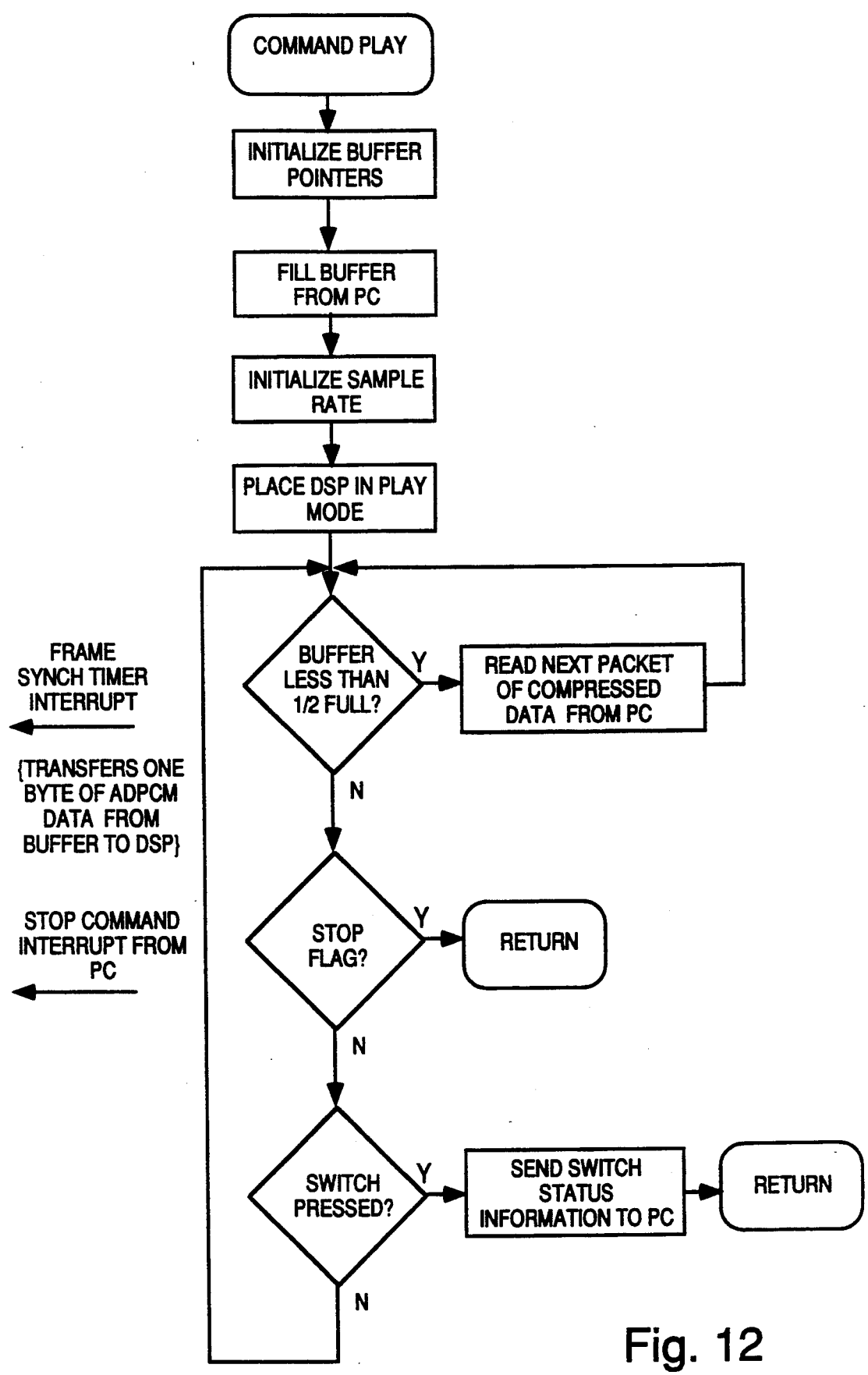

If a switch is pressed which is determined by the personal computer to be a switch which initiates a record operation, the personal computer asserts line RTS low to cause microcontroller execution to jump from the flow of FIG. 6 into the command interrupt routine of FIG. 11. As described above, microcontroller U1 receives the command in serial form on RXD pin 11 from the personal computer via serial data line RX, level shifting buffer chip U7, and intermediate line IRX. If the microcontroller does not receive a command on RXD pin 11, a time out error occurs. The microcontroller U1 then jumps to the appropriate routine for the particular command received. Of the possible commands listed in Appendix A, program execution for the play (playback) command and the record command are shown in FIGS. 12 and 13, respectively.

Figure 13:
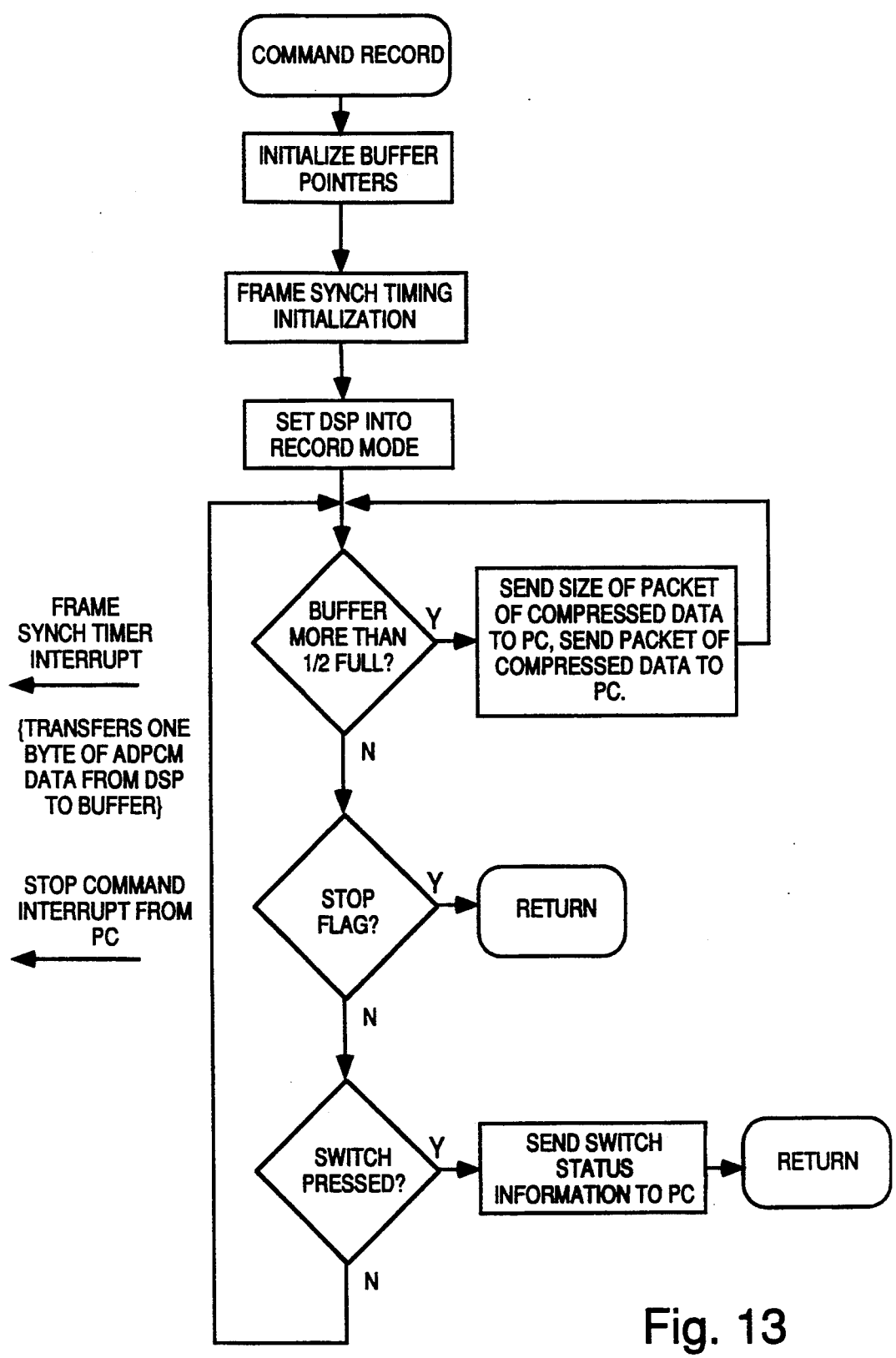

Because the switch pressed in the present operational example was a switch determined by the personal computer to initiate a record command, firmware execution proceeds to the flow of FIG. 13.

A RAM buffer in the on-board RAM of the microcontroller is first initialized to hold compressed sound data received from DSP U5. The buffer pointers indicating the starting and ending locations of the buffer are set to indicate that nothing is presently in the buffer.

Next, the selected frame sync timing and sample rate are initialized.

The microcontroller then sets the DSP into the record mode by sending appropriate commands to the DSP using two lines, COMMAND_SI/O_DATA and COMMAND_SI/O_CLK. Accordingly, analog signals from pin 1 of header JP9 are transmitted through phonejack J2, are amplified by amplifier U9A, are relayed through volume control amplifier U9B to codec input AIN+ pin 1, are digitized by codec U2 into pulse code modulated signals output from codec PCMOUT pin 17, are received by DSP U5 in the form of $\mu$Law pulse code modulated signals on input pin PCMIN 27. The DSP can then begin compressing the sound data according to an ADPDM compression method.

Because the peripheral in this operational example has performed no recording after the above-described power on reset sequence, the buffer is empty. Microcontroller execution therefore proceeds to check if a stop command has been issued from the personal computer. If no stop flag has been set, microcontroller execution proceeds to monitor the switches to check if a switch has been pressed. If a switch has been pressed, the record operation is stopped. The microcontroller then interrupts the personal computer and causes the switch status information to be passed to the personal computer as described above. After the passing of switch status information to the personal computer, microcontroller execution returns to monitoring the switches in FIG. 6.

Figure 10:
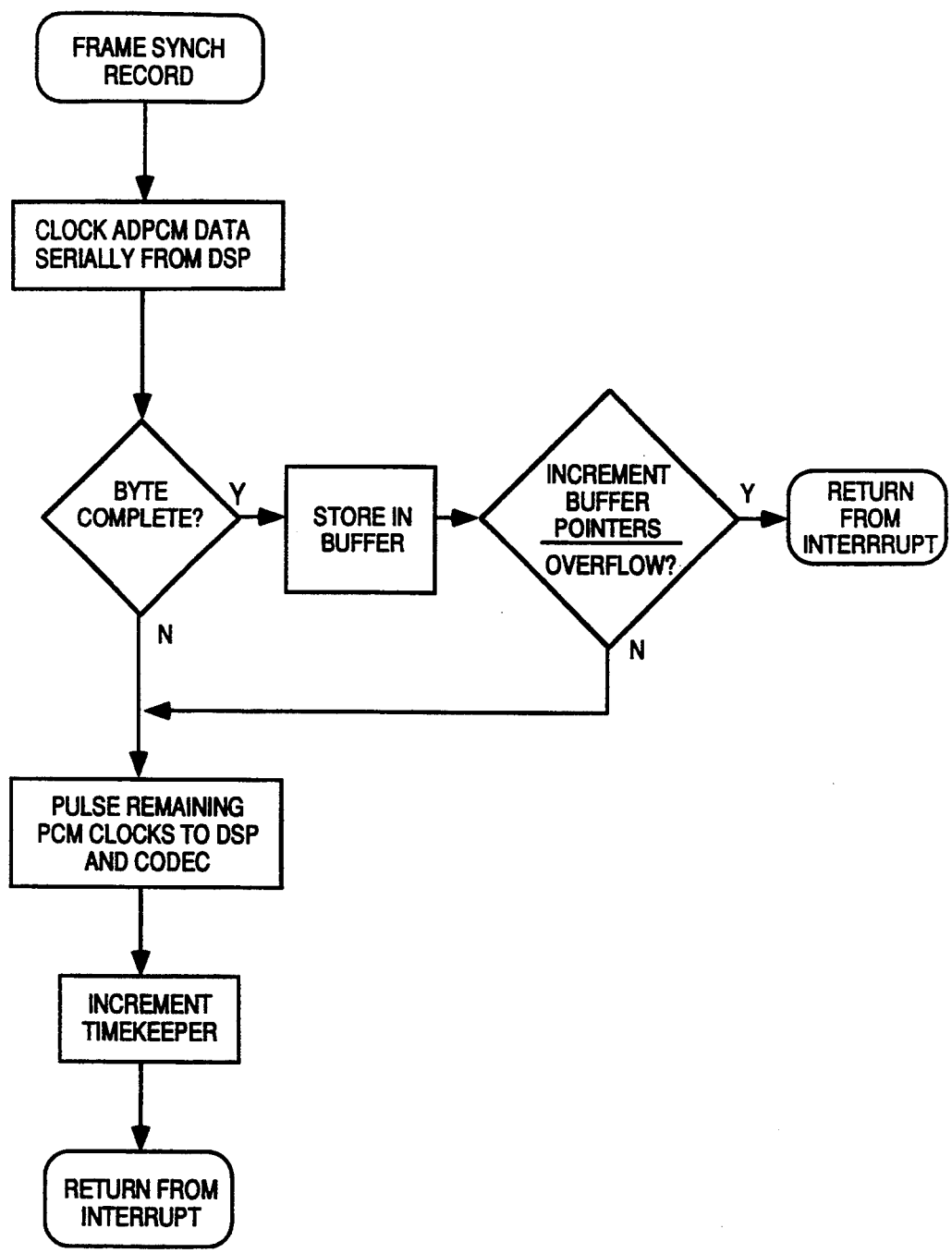

Assuming that the switch status has not changed, however, microcontroller execution remains in the flow of FIG. 13. When a frame synchronization timer interrupt occurs, microcontroller execution jumps to the flow of FIG. 7, strobes DSP U5 and codec U2 with a frame synchronization pulse, and then proceeds to the flow of FIG. 10. Because the DSP compresses sound data synchronously with the frame synchronization signal, 4/3/2 bit compressed sound data byte (the byte can be 4 bits, 3 bits or 2 bits depending on the sample rate) is available from the DSP U5. As indicated in FIG. 10, the microcontroller U1 reads the compressed sound data byte from the DSP serially via lines CPXOUT pin 20 of U5 and CPXCLK pin 17 of U5. The compressed sound data is then saved into the buffer in the microcontroller and the buffer pointers are incremented appropriately. Provided there is no overflow of the buffer, the microcontroller outputs the remaining pulse code modulated clocks of the frame synchronization period to the DSP and codec, increments the time keeper, and returns to the flow of FIG. 12.

Successive frame synchronization periods are then handled in similar fashion with a frame synchronization timer interrupt causing addition bytes of compressed sound data to be read from the DSP, with the buffer pointers being incremented appropriately. When the buffer inside the microcontroller reaches half full, the flow of FIG. 12 causes the microcontroller to send a packet of compressed data from the buffer of the microcontroller to the personal computer to empty the buffer. This process of reading bytes of compressed sound data from the DSP and then periodically transferring the compressed sound data from the buffer of the microcontroller continues until another switch is pressed or released or until the personal computer interrupts the peripheral with a request to send the peripheral a command.

Because only one digitized sound value is generated by the DSP during each 125 microsecond frame synch, and because the compressed data transfer to the microcontroller takes a an amount of time much smaller the 125 microseconds, the switch polling tasks and the communication tasks of the microcontroller are not impeded by the requirement of receiving compressed sound data. The microcontroller can easily poll the switches, handle communications with the personal computer, and receive a compressed sound data bytes from the DSP within each successive frame synch period.

When the buffer in the personal computer is half full, the personal computer enters DOS (disk operating system) to store the contents of $\frac{1}{2}$ of the buffer onto disk. The personal computer, using a ring buffer, continues to receive packets from the microcontroller even while the half buffer has been saved to disk.

RELEASING THE RECORD SWITCH

In one possible embodiment, releasing the record switch causes the microcontroller to monitor a different switch status in the loop of FIG. 13. The microcontroller therefore interrupts the personal computer and relays the switch status information to the personal computer as described above. Microcontroller execution therefore proceeds from the flow of FIG. 13 into the command interrupt routine of FIG. 11. Because the changed switch status is interpreted by the personal computer as a stop command, the microcontroller stops receiving compressed sound data from the DSP. The peripheral enters the idle state and the microcontroller returns to the monitoring of the switches of FIG. 6.

PRESSING THE PLAY SWITCH

If the play switch is then pressed, the microcontroller interrupts the personal computer and transfers the switch status information to the personal computer as previously described. Microcontroller execution therefore proceeds from the flow of FIG. 6 to the command interrupt routine of FIG. 11. The command in this case, however, is a play command. Microcontroller execution therefore proceeds from the flow of FIG. 11 to the flow of FIG. 12.

The personal computer causes the buffer inside the microcontroller and the accompanying buffer pointers to be initialized. The personal computer then transfers the compressed sound data which is to be played into the buffer of the microcontroller. The personal computer first alerts the microcontroller of the compressed sound data to be transferred by asserting line RTS. The microcontroller then responds that it is ready to receive the compressed sound data by asserting line CTS. When the personal computer detects line CTS at a low logic level, the personal computer begins transferring a packet of compressed sound data to the microcontroller via line RX, buffer chip U7, and intermediate line IRX.

After filling its buffer with compressed data from the personal computer, the microcontroller initializes the DSP with the appropriate sample rate for the compressed sound data in the buffer. The microcontroller then determines if the buffer is less than half full. Because no compressed sound data has yet been read out of the buffer and to the DSP, the buffer is not less than half full. The microcontroller therefore proceeds to check if a stop command has been issued. If the stop flag is not set, the microcontroller monitors the switches.

In the present operational example, the switch status has not changed since the pressing of the play switch. As a result, the microcontroller does not have to send a new switch status to the personal computer. Rather, microcontroller execution remains in the flow of FIG. 12 until a frame synchronization timer interrupt occurs or until the personal computer interrupts the microcontroller with a command. In the present operational example, the play switch remains in the pressed condition until a frame synchronization timer interrupt causes microcontroller U1 to jump to the flow of FIG. 7. Because the peripheral is currently in the play mode, the microcontroller strobes the frame synchronization signal to the DSP and the codec and jumps to the flow of FIG. 9.

Figure 9:
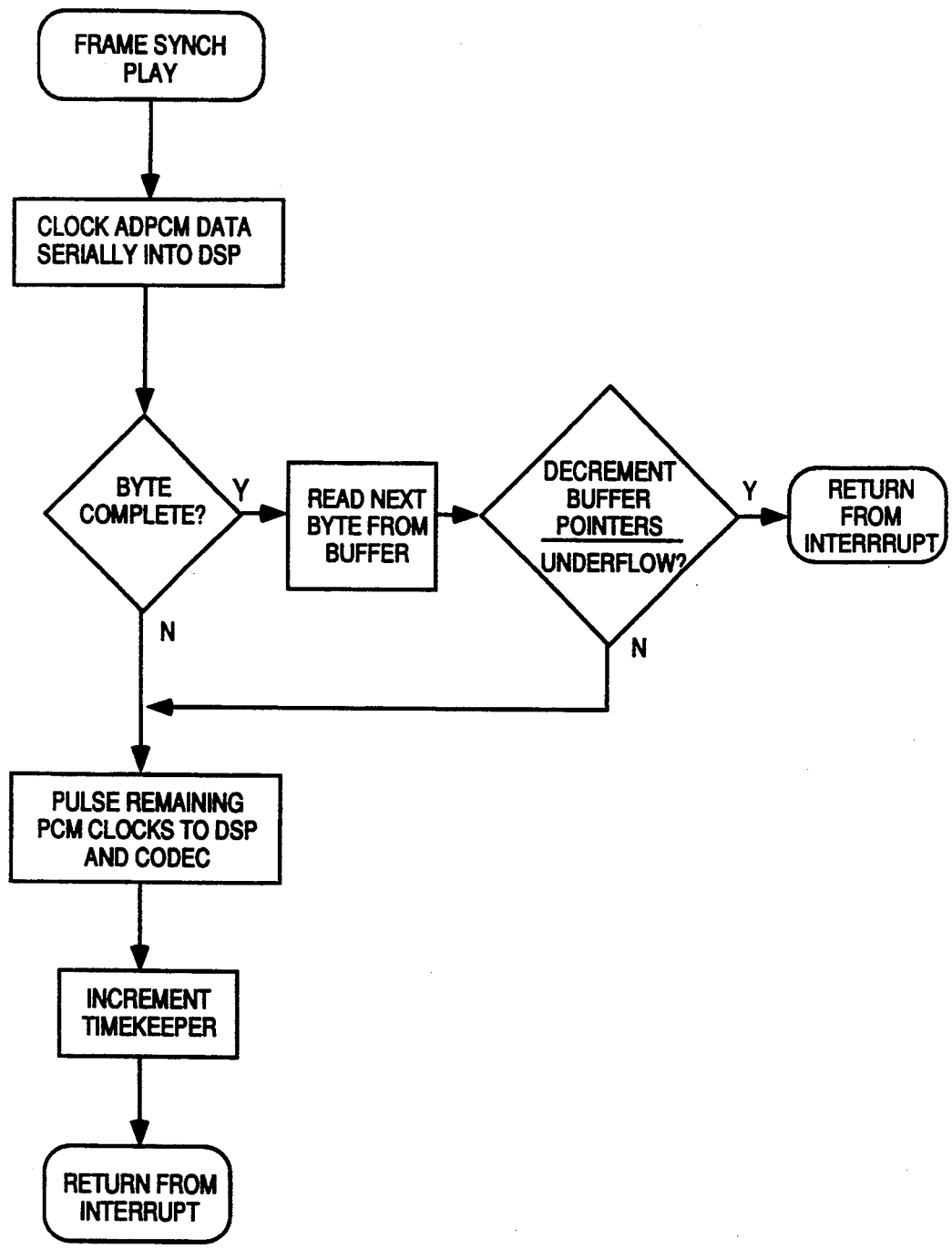

As shown in FIG. 9, the microcontroller clocks the first compressed sound data byte to the DSP via lines CPXIN and CPXCLK. When the full eight bits of the first byte are clocked out of the microcontroller and into the DSP, the buffer pointers are decremented appropriately. If no underflow of the buffer has occurred, the remaining pulse code modulated clock pulses of the frame synchronization period are output from the microcontroller and the timekeeper is incremented. Microcontroller execution then returns back to the loop shown in FIG. 12. As indicated in FIG. 12, this process of interrupting the microcontroller out of the flow of FIG. 12 to output a single byte of compressed sound data to the DSP once during each frame synchronization period continues until the microcontroller detects that its buffer is less than half full. The microcontroller then signals the personal computer to send another packet of compressed sound data. This transfer of single bytes of compressed data to the DSP and the replenishing of the microcontroller buffer with new compressed sound data from the personal computer continues until the play switch is pressed again or one of the other switches are pressed.

In the embodiment of FIG. 5, a rotary potentiometer R20 volume control is provided for manually controlling the volume of the sound output from the speaker. This rotary potentiometer is indicated in FIG. 2 by reference numeral 19. The embodiment of FIG. 5 also provides automatic gain control of the microphone amplifier U9B by including a digital variable resistor U10 which is under the control of microcontroller U1. By controlling the resistance through U10, the microcontroller can control the amplitude of the electrical signals input into the codec. Power for the circuitry of FIG. 5 may be derived from the personal computer via pin 10 of the RS-232 connector JP4 or from a single 9 volt battery (not shown) via connector JP2. In either case, a 5 volt voltage regulator U8 is used to maintain voltage supply +5 VD at a constant 5 volts. Voltage inverter U3 is used to generate a negative 5 volt signal from the +5 VD supply.

Some embodiments of the hand holdable peripheral may comprise an identification code which is supplied by the microcontroller to the software in the personal computer after connecting the peripheral to the personal computer. If after connecting the peripheral to the personal computer, the peripheral does not transmit the proper identification code to the personal computer, the software of the personal computer can identify the peripheral as not being permitted to be used with the software on the personal computer. In FIG. 5, for example, microcontroller can read the identification codec of the peripheral from part Q2 serially via pin 18 of the microcontroller. Because each individual peripheral contains a different identification part Q2, each individual peripheral can be identified from the others by the software on the personal computer.

Figure 14:
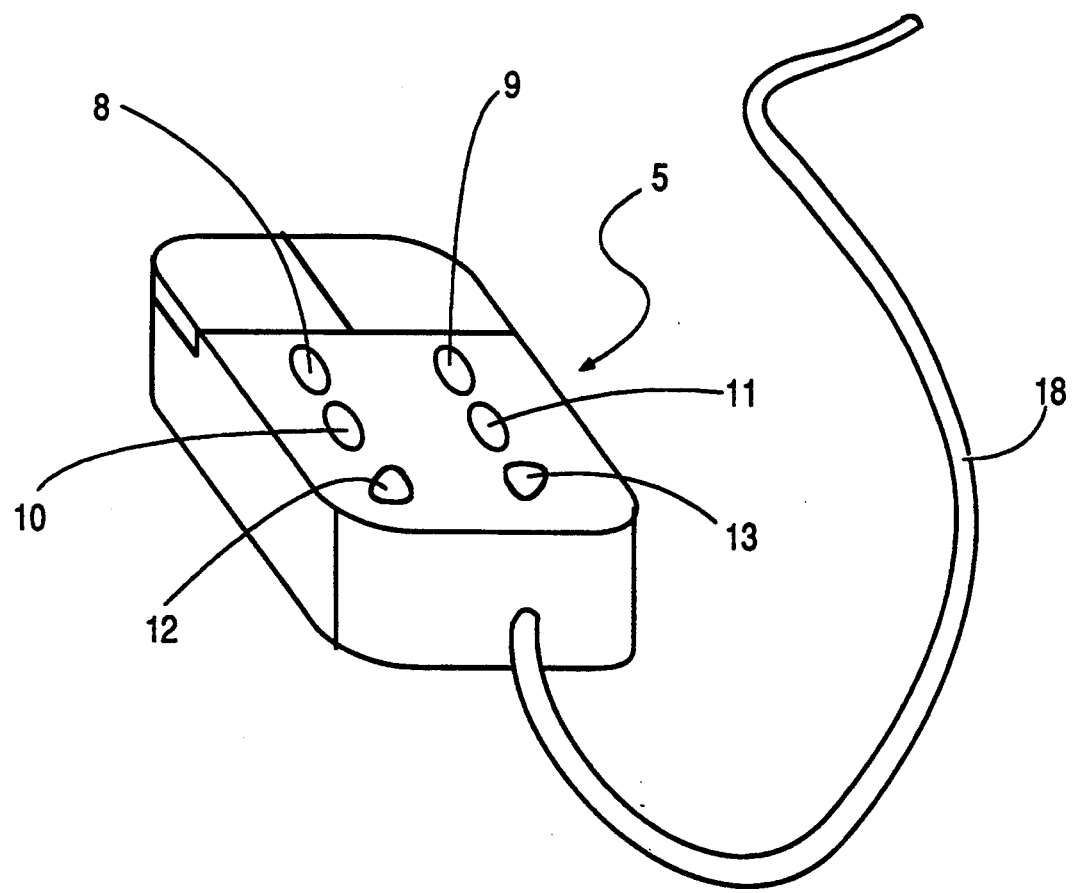
FIG. 14 is a perspective view of another embodiment according to the present invention wherein the peripheral incorporates a mouse mechanism.
Figure 15:
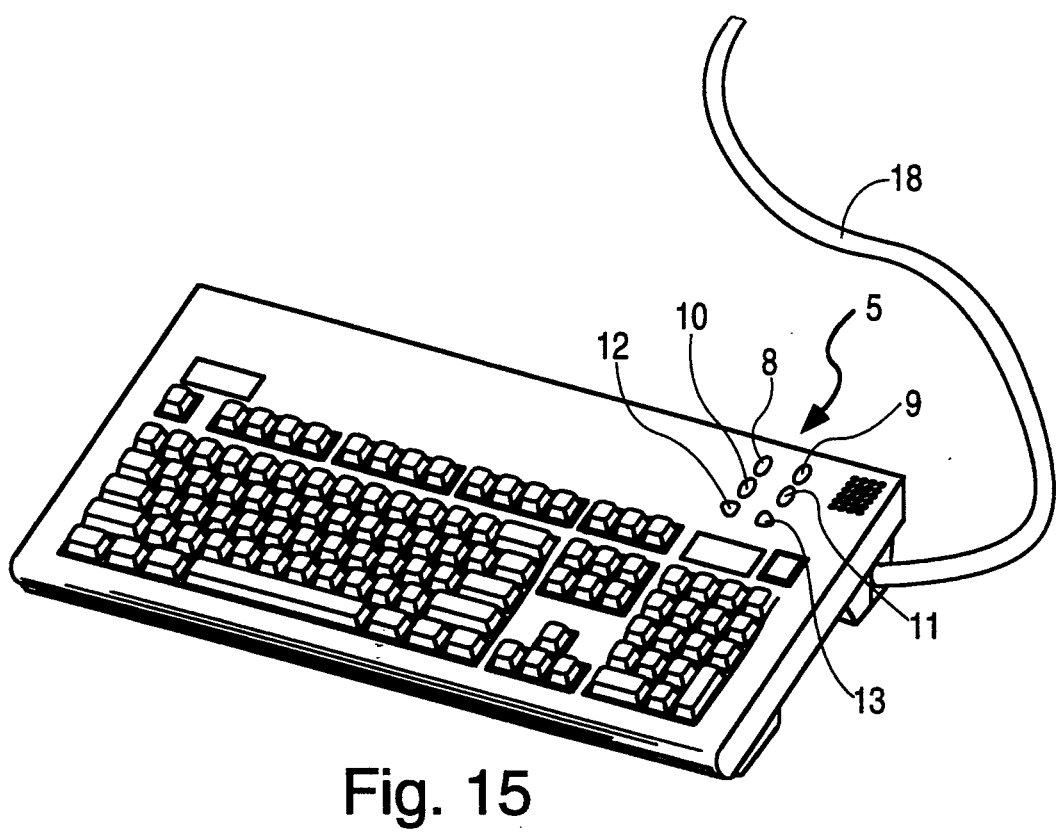
FIG. 15 is a perspective view of another embodiment according to the present invention wherein the peripheral incorporates a computer keyboard.

FIG. 14 is a perspective view of another embodiment according to the present invention wherein the peripheral incorporates a mouse mechanism. FIG. 15 is a perspective view of yet another embodiment according to the present invention wherein the peripheral incorporates a computer keyboard.

Although the present invention has been described in connection with the above described illustrative embodiments, the present invention is not limited thereto. Various modifications and adaptations of the discussed embodiments are encompassed by the claimed invention as set forth in the appended claims.

| APPENDIX A | |
|---|---|
| COMMAND RECOGNIZED BY THE PERIPHERAL | SUMMARY OF THE COMMAND |
| PLAYBACK START | START THE PERIPHERAL IN PLAYBACK MODE. |
| RECORD START | START THE PERIPHERAL IN RECORD MODE. |
| STOP | STOPS ALL OPERATIONS, AND PLACES PERIPHERAL IN IDLE MODE. |
| READ KEY SWITCH CODE | SENDS LAST KEY (SWITCH) PRESS CODE AND CURRENT KEY (SWITCH) STATUS. |
| BAUD RATE | SETS COMMUNICATION |

| APPENDIX A | |
|---|---|
| COMMAND RECOGNIZED BY THE PERIPHERAL | SUMMARY OF THE COMMAND |
| (38,400; 57,600; 115,200) | BIT RATE TO/FROM PERSONAL COMPUTER. |
| SAMPLE RATE (8K, 16K, 24K, 32K) | SETS THE ANALOG TO DIGITAL CONVERSION SAMPLING RATE. |
| MICROPHONE AMPLIFICATION (UP; DOWN) | INCREASES/DECREASES THE SPEAKER OUTPUT (VOLUME) LEVEL. |
| SPEAKER VOLUME (UP; DOWN) | INCREASES/DECREASES THE SPEAKER OUTPUT (VOLUME) LEVEL. |
| SERIAL NUMBER CHECK | SENDS SERIAL NUMBER OF PERIPHERAL. |
| AUTOMATIC GAIN CONTROL (ON; OFF) | CONTROLS THE USAGE OF AUTOMATIC GAIN CONTROL SOFTWARE FEATURE. |
| POWER DOWN | PLACES THE PERIPHERAL IN A LOW POWER MODE. |
| TONE (ON; OFF) | TURNS 640 HZ TONE ON AND OFF. |
| STATUS READ | INSTRUCTS PERIPHERAL TO SEND STATUS INFORMATION OF THE PERIPHERAL TO THE PERSONAL COMPUTER. |
| RESET | RESETS/CLEARS PERIPHERAL TO POWER-ON STATE. |

I claim:

1. A system for storing and retrieving sound data, comprising a hand holdable peripheral and a computer, said hand holdable peripheral comprising means for controlling storage of sound data to a sound data storage device and for controlling retrieval of said sound data from said sound data storage device.

2. The system of claim 1, wherein said means for controlling comprises a plurality of hand holdable switches, wherein said hand holdable peripheral further comprises a microphone and a speaker, wherein said sound data storage device is part of a personal computer, and wherein said hand holdable peripheral is coupled to said personal computer by a serial link.

3. A peripheral for communicating with a computer, comprising:
   a plurality of manually operable switches;
   a sound input transducer having an output;
   a sound output transducer having an input;
   a data communication channel interface coupling said peripheral to a remote sound data storage device so that compressed sound data can be communicated between the remote sound data storage device and the peripheral; and
   a sound data compressor/decompressor having a first input, a second input, a third input, a first output, and a second output, said first input being coupled to said output of said sound input transducer, said second input being coupled to said plurality of switches, said third input being coupled to said data communication channel interface, said first output being coupled to said input of said sound output transducer, said second output being coupled to said data communication channel interface, said peripheral being a hand holdable peripheral.

4. The hand holdable peripheral of claim 1, further comprising a housing, said plurality of switches being disposed with respect to said housing such that a thumb of a hand grasping the housing can operate said plurality of switches when the housing is grasped in the palm of the hand.

5. The hand holdable peripheral of claim 4, wherein said housing has a first surface substantially facing said palm of said hand when said housing is grasped in said palm of said hand, and wherein said housing has a second surface facing at least partly in a direction substantially opposite said first surface, said sound output transducer being disposed substantially facing said direction substantially opposite said first surface.

6. The hand holdable peripheral of claim 1, further comprising a housing, said plurality of switches being disposed with respect to said housing such that a forefinger of a hand grasping the housing can operate said plurality of switches.

7. The hand holdable peripheral of claim 6, wherein said housing is graspable between a thumb of said hand and one of a middle finger, a ring finger and a small finger of said hand, a first surface of said housing contacting said thumb, a second surface contacting one of said middle finger, ring finger and small finger.

8. The hand holdable peripheral of claim 1, further comprising a housing, said housing retaining a mouse mechanism, said plurality of switches being disposed with respect to said housing such that a first surface of said housing contacts a thumb of a hand when said hand is grasping the housing, and such that a second surface of said housing contacts one of a middle finger, a ring finger, and a small finger of said hand when said hand is grasping the housing.

9. The hand holdable peripheral of claim 1, wherein said sound data compressor/decompressor comprises a codec coupled to a digital signal processor, said codec also being coupled to said output of said sound input transducer, said codec also being coupled to said input of said sound output transducer.

10. The hand holdable peripheral of claim 9, wherein said sound data compressor/decompressor further comprises a microcontroller coupled to said digital signal processor, said microcontroller being coupled to said plurality of switches, said microcontroller being coupled to said data communication channel interface.

11. The hand holdable peripheral of claim 9, wherein said codec is a μLaw codec and wherein said digital signal processor performs ADPCM compression and decompression.

12. The hand holdable peripheral of claim 9, wherein said plurality of manually operable switches comprises a record switch, a play switch, and a rewind switch, wherein an actuation of said record switch causes sound incident upon said sound input transducer to be digitized and compressed into said compressed sound data, wherein an actuation of said play switch causes previously compressed sound data to be decompressed and converted into analog form such that sound representative of said compressed sound data is generated by said sound output transducer, and wherein an actuation of said rewind switch causes a pointer indicative of a location in a sequence of previously compressed sound data to be moved.

13. The hand holdable peripheral of claim 12, wherein said plurality of manually operable switches further comprises a stop switch, and a fast forward switch, wherein an actuation of said stop switch causes one of a play function and a record function to stop, said record function comprising a digitization and compression of sound incident on said sound input transducer into compressed sound data, said play function comprising a decompression and conversion into an analog form of previously compressed sound data such that sound representative of said previously compressed sound data is generated by said sound output transducer, and wherein an actuation of said fast forward switch causes a pointer indicative of a location in a sequence of compressed sound data to be moved through said sequence of compressed sound data faster than compressed sound data of a sequence of compressed sound data is converted into sound during said play function.

14. The hand holdable peripheral of claim 9, wherein said switches are pushbutton switches.

15. The hand holdable peripheral of claim 1, wherein said data communication channel interface comprises a serial bus interface.

16. The hand holdable peripheral of claim 1, wherein said data communication channel interface comprises a parallel bus interface.

17. The hand holdable peripheral of claim 1, wherein said data communication channel interface comprises an interface of a wireless communication channel.

18. The hand holdable peripheral of claim 1, wherein said remote sound data storage device is part of said computer.

19. The hand holdable peripheral of claim 16, wherein sound received by said sound input transducer is compressed by said sound data compressor/decompressor into sound data, said sound data being communicated to said personal computer via said data communication channel interface, said sound data being stored on a mass data storage device of said personal computer, and wherein said sound data stored on said mass data storage device is communicated from said personal computer to said hand holdable peripheral via said data communication channel interface, decompressed by said sound data compressor/decompressor, and output to said sound output transducer.

20. The hand holdable peripheral of claim 19, wherein said mass data storage device comprises a hard disk drive.

21. The hand holdable peripheral of claim 20, wherein said data communication channel interface is an interface utilizing RS-232 voltage levels.

22. The hand holdable peripheral of claim 20, wherein said data communication channel interface is an infrared serial link interface.

23. A sound storage and sound retrieval system, comprising:
- a hand holdable peripheral having hand operable switches, said peripheral converting and compressing sound into compressed sound data, said peripheral decompressing and converting said compressed sound data into sound;
- a remote compressed sound storage device which stores and retrieves compressed sound data, said remote compressed sound storage device being coupled to said peripheral such that compressed data can be transferred between said peripheral and said remote compressed sound storage device;
- application software operating in a computer; and
- a driver program operating in said computer, said driver program causing said computer to execute a keystroke handling routine in said application software when one of said hand operable switches is pressed.

24. The system of claim 23, wherein said driver program comprises a software interrupt instruction, said software interrupt instruction causing said computer to execute said keystroke handling routine in said application software when said one of said hand operable switches is pressed.

25. A peripheral for use with a computer, said peripheral being movable with respect to said computer when said peripheral and said computer are operating, said peripheral comprising:
- a microphone;
- a speaker;
- sound compression/decompression means for receiving input electrical signals from said microphone, for compressing said input electrical signals into compressed sound data, for decompressing said compressed sound data into output electrical signals, and for supplying said output electrical signals to said speaker;
- a plurality of hand operable switches; and
- means for communicating with said computer, for detecting a status of said plurality of switches, for relaying said status of said plurality of switches to said computer, and for relaying compressed sound data between said sound compression/decompression means and said computer.

26. The peripheral of claim 25, wherein said computer is a personal computer, wherein said compressed sound data is compressed according to an ADPCM compression method.

27. The peripheral of claim 25, wherein said peripheral is a keyboard.

28. The peripheral of claim 25, wherein said peripheral is a hand holdable peripheral.

29. A sound storage and sound retrieval system, comprising:
- a hand holdable peripheral having hand operable switches, said peripheral converting and compressing sound into compressed sound data, said peripheral decompressing and converting said compressed sound data into sound, each switch of said switches having a function;
- a remote compressed sound storage device which stores and retrieves compressed sound data, said remote compressed sound storage device being coupled to said peripheral such that compressed data can be transferred between said peripheral and said remote compressed sound storage device;
- application software operating in a computer, said application software determining the functions of at least some of said switches; and
- a driver program operating in said computer, said driver program relaying switch status information to said application software.

30. The sound storage and sound retrieval system of claim 29, wherein one of said hand operable switches has a first function during a first period of time, said first function being determined by said application software, and wherein said one of said hand operable switches has a second function during a second period of time, said second function also being determined by said application software.

31. The sound storage and sound retrieval system of claim 30, wherein said first function is selected from the group consisting of: a PLAY function, a STOP function, a REWIND function, a FAST FORWARD function, and a PAUSE function.

32. The sound storage and sound retrieval system of claim 29, wherein said application software indicates to said driver program a memory location in said computer where a keystroke handling routine of said application software is located.

* * * * *